US009081079B2

(12) United States Patent
Chao et al.

(10) Patent No.: US 9,081,079 B2
(45) Date of Patent: Jul. 14, 2015

(54) ADAPTIVE UPDATING OF INDOOR NAVIGATION ASSISTANCE DATA FOR USE BY A MOBILE DEVICE

(75) Inventors: Hui Chao, San Jose, CA (US); Saumitra Mohan Das, Santa Clara, CA (US); Rajarshi Gupta, Sunnyvale, CA (US); Behrooz Khorashadi, Mountain View, CA (US); Vinay Sridhara, Santa Clara, CA (US); Payam Pakzad, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 13/545,858

(22) Filed: Jul. 10, 2012

(65) Prior Publication Data

US 2013/0295952 A1 Nov. 7, 2013

Related U.S. Application Data

(60) Provisional application No. 61/641,416, filed on May 2, 2012.

(51) Int. Cl.
*H04W 24/00* (2009.01)
*G01S 5/02* (2010.01)
*G01S 5/00* (2006.01)

(52) U.S. Cl.
CPC ............. *G01S 5/0236* (2013.01); *G01S 5/0045* (2013.01); *G01S 5/0252* (2013.01); *G01S 5/0278* (2013.01)

(58) Field of Classification Search
CPC ........... G01C 21/3626; G01C 21/3644; G01C 21/367; G01C 21/3682; G01C 21/3685; H04M 1/72572

USPC .................. 455/404.2, 432.1–442 B, 452.2, 455/456.1–456.3, 457; 370/329, 331–334
See application file for complete search history.

(56) References Cited

U.S. PATENT DOCUMENTS

| | | | |
|---|---|---|---|
| 4,697,281 A * | 9/1987 | O'Sullivan | 455/557 |
| 7,315,259 B2 | 1/2008 | Sacks | |
| 7,366,610 B2 | 4/2008 | Karaoguz et al. | |
| 7,519,470 B2 | 4/2009 | Brasche et al. | |
| 7,738,884 B2 | 6/2010 | Cheung et al. | |
| 7,894,984 B2 | 2/2011 | Rasmussen et al. | |
| 8,064,414 B2 * | 11/2011 | Wallace et al. | 370/338 |
| 8,150,367 B1 | 4/2012 | Malladi et al. | |
| 2008/0147730 A1 * | 6/2008 | Lee et al. | 707/104.1 |
| 2008/0176583 A1 | 7/2008 | Brachet et al. | |
| 2008/0249704 A1 | 10/2008 | Cummings | |
| 2011/0039576 A1 * | 2/2011 | Prakash et al. | 455/456.1 |

(Continued)

OTHER PUBLICATIONS

International Search Report and Written Opinion—PCT/US2013/038932—ISA/EPO—Jul. 30, 2013.

*Primary Examiner* — Dai A Phuong
(74) *Attorney, Agent, or Firm* — Berkeley Law & Technology Group, LLP

(57) ABSTRACT

Various methods, apparatuses and articles of manufacture may be implemented for use in one or more computing platforms to adaptively provide and/or obtain indoor navigation assistance data (INAD) update(s) for use by a mobile device. An INAD update may, for example, comprise a subset of INAD available for an indoor environment. Such a subset may be determined based, at least in part, on a bounded region in an electronic map of the indoor environment. Such a bounded region may, for example, have a shape and/or a size based, at least in part, on at least one parameter indicative of a motion state of the mobile device.

63 Claims, 8 Drawing Sheets

(56) References Cited

U.S. PATENT DOCUMENTS

2011/0137549 A1* 6/2011 Gupta et al. .................. 701/201
2011/0164569 A1* 7/2011 Bamberger et al. ........... 370/328
2012/0028649 A1 2/2012 Gupta et al.
2012/0158297 A1* 6/2012 Kim et al. ..................... 701/516
2013/0030129 A1* 1/2013 Hong et al. ................... 525/411
2013/0131972 A1* 5/2013 Kumar et al. ................. 701/409
2013/0288718 A1* 10/2013 MacGougan et al. ..... 455/456.4
2014/0287773 A1* 9/2014 Agerstam et al. .......... 455/456.1

* cited by examiner

ADAPTIVE UPDATING OF INDOOR NAVIGATION ASSISTANCE DATA FOR USE BY A MOBILE DEVICE

CLAIM OF PRIORITY UNDER 35 U.S.C. §119

This application claims priority under 35 USC 119 to U.S. Provisional Application Ser. No. 61/641,416, filed May 2, 2012, and entitled, "ADAPTIVE UPDATING OF INDOOR NAVIGATION ASSISTANCE DATA FOR USE BY A MOBILE DEVICE", which is assigned to the assignee hereof and which is incorporated herein by reference.

BACKGROUND

1. Field

The subject matter disclosed herein relates to electronic devices, and more particularly to methods, apparatuses and articles of manufacture for use in one or more computing platforms to adaptively update indoor navigation assistance data (INAD) for use by a mobile device.

2. Information

Mobile devices, such as mobile phones, notebook, computers, etc., typically have the ability to estimate location and/or position with a high degree of precision using any one of several technologies such as, for example, satellite positioning systems (e.g., GPS and the like), advanced forward-link trilateration (AFLT), just to name a few examples of signal-based positioning systems and/or corresponding signal-based positioning signals. Using high precision location information, applications for a mobile device may provide a user with various services, such as, for example, vehicle/pedestrian navigation, location-based searching, just to name a couple of examples. Here, high precision signal-based location information (e.g., obtained from GPS and/or other signal-based positioning systems) may be processed according to a global coordinate system (e.g., latitude and longitude or earth-centered xyz coordinates). While such use of signal-based location information referenced to a global coordinate system may be useful in providing some services (e.g., outdoor vehicle navigation), such signal-based location information referenced to a global coordinate system may be impractical for other types of services such as indoor pedestrian navigation.

In certain indoor environments, such as office buildings, shopping malls, airports, stadiums, etc., certain example signal-based positioning techniques may make use of various terrestrial-based wireless signal transmitting devices, e.g., wireless network access points, cellular network base stations, special-purpose beacon transmitters, etc., that transmit wireless signals which may be received by the mobile device and used for positioning purposes. For example, a mobile device may receive a signal-based positioning signal from a transmitter and based thereon determine a pseudorange between the transmitter and receiver. Hence, for example, positioning may be provided based on trilateration and/or other known signal-based positioning techniques.

In some implementations, an indoor navigation system may provide a digital electronic map to mobile devices as they enter a particular indoor area. Such electronic map may show indoor features such as doors, hallways, entry ways, walls, etc., points of interest such as bathrooms, pay phones, room names, stores, etc. Such electronic map may be stored at a server to be accessible by a mobile device through selection of a URL, for example. By obtaining and rendering all or part of an electronic map via a display mechanism, a mobile device may, for example, overlay a current location of the mobile device (and user) over the displayed map to provide the user with additional context.

In certain instances, in addition to an electronic map, an indoor navigation system may selectively provide assistance information to mobile devices to facilitate and/or enable various location based services. Such assistance information may include, for example, information to facilitate measurements of ranges to wireless access points at known fixed locations. In one implementation, For example, "radio heatmap" or "probability heatmap" data indicating and/or otherwise modeling expected RSSI and/or round-trip delay times associated with access points may enable a mobile device to associate signal measurements with locations in an indoor environment. Here, for example, grid points may be laid over locations in an indoor environment at uniform spacing (e.g., 0.5 meter separation of neighboring grid points), or possibly with non-uniform spacing. Thus, radio heatmap and/or other corresponding probability functions/models may be made available from a computing device (such as a server) for each grid point covering an indoor environment.

SUMMARY

In accordance with certain aspects, a method may comprise, with a mobile device: transmitting a request for an indoor navigation assistance data (INAD) update, the request for the INAD update being based, at least in part, on at least one parameter indicative of a motion state of the mobile device within an indoor environment; and receiving the INAD update, the INAD update comprising a subset of INAD that is available for the indoor environment, the subset of INAD being determined based, at least in part, on a bounded region in an electronic map of the indoor environment, the bounded region having at least one of: a shape and/or a size affected based, at least in part, on the at least one parameter.

In accordance with certain aspects, an apparatus for use in a mobile device may comprise: means for transmitting a request for an INAD update, the request for the INAD update being based, at least in part, on at least one parameter indicative of a motion state of the mobile device within an indoor environment; and means for receiving the INAD update, the INAD update comprising a subset of INAD that is available for the indoor environment, the subset of INAD being determined based, at least in part, on a bounded region in an electronic map of the indoor environment, the bounded region having at least one of: a shape and/or a size affected based, at least in part, on the at least one parameter.

In accordance with certain aspects, a mobile device may comprise: a communication interface; and one or more processing units to: initiate transmission of a request for an INAD update to a computing device via the communications interface, the request for the INAD update being based, at least in part, on at least one parameter indicative of a motion state of the mobile device within an indoor environment; and obtain the INAD update from the computing device via the communications interface, the INAD update comprising a subset of INAD that is available for the indoor environment, the subset of INAD being determined based, at least in part, on a bounded region in an electronic map of the indoor environment, the bounded region having at least one of: a shape and/or a size affected based, at least in part, on the at least one parameter.

In accordance with certain aspects, an article of manufacture may comprise a non-transitory computer readable medium having stored therein computer implementable instructions executable by one or more processing units of a mobile device to: initiate transmission of a request for an INAD update to a computing device via the communications interface, the request for the INAD update being based, at least in part, on at least one parameter indicative of a motion state of the mobile device within an indoor environment; and obtain the INAD update from the computing device via the communications interface, the INAD update comprising a subset of INAD that is available for the indoor environment, the subset of INAD being determined based, at least in part, on a bounded region in an electronic map of the indoor environment, the bounded region having at least one of: a shape and/or a size affected based, at least in part, on the at least one parameter.

In accordance with certain aspects, a method may comprise, with a computing device: obtaining INAD for an indoor environment; receiving a request for an INAD update from a mobile device, the request for the INAD update being based, at least in part, on at least one parameter indicative of a motion state of the mobile device within the indoor environment; and transmitting the INAD update to the mobile device, the INAD update comprising a subset of the INAD, the subset of INAD being determined based, at least in part, on a bounded region in an electronic map of the indoor environment, the bounded region having at least one of: a shape and/or a size affected based, at least in part, on the at least one parameter.

In accordance with certain aspects, an apparatus for use in a computing device may comprise: means for obtaining INAD for an indoor environment; means for receiving a request for an INAD update from a mobile device, the request for the INAD update being based, at least in part, on at least one parameter indicative of a motion state of the mobile device within the indoor environment; and means for transmitting the INAD update to the mobile device, the INAD update comprising a subset of the INAD, the subset of INAD being determined based, at least in part, on a bounded region in an electronic map of the indoor environment, the bounded region having at least one of: a shape and/or a size affected based, at least in part, on the at least one parameter.

In accordance with certain aspects, a computing device may comprise: a communication interface; and one or more processing units to: obtain INAD for an indoor environment; obtain a request for an INAD update from a mobile device via the communication interface, the request for the INAD update being based, at least in part, on at least one parameter indicative of a motion state of the mobile device within the indoor environment; and initiate transmission of the INAD update to the mobile device via the communication interface, the INAD update comprising a subset of the INAD, the subset of INAD being determined based, at least in part, on a bounded region in an electronic map of the indoor environment, the bounded region having at least one of: a shape and/or a size affected based, at least in part, on the at least one parameter.

In accordance with certain aspects, an article of manufacture may comprise a non-transitory computer readable medium having stored therein computer implementable instructions executable by one or more processing units in a computing device to: access INAD for an indoor environment; obtain a request for an INAD update from a mobile device, the request for the INAD update being based, at least in part, on at least one parameter indicative of a motion state of the mobile device within the indoor environment; and initiate transmission of the INAD update to the mobile device, the INAD update comprising a subset of the INAD, the INAD update comprising a subset of the INAD, the subset of INAD being determined based, at least in part, on a bounded region in an electronic map of the indoor environment, the bounded region having at least one of: a shape and/or a size affected based, at least in part, on the at least one parameter.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
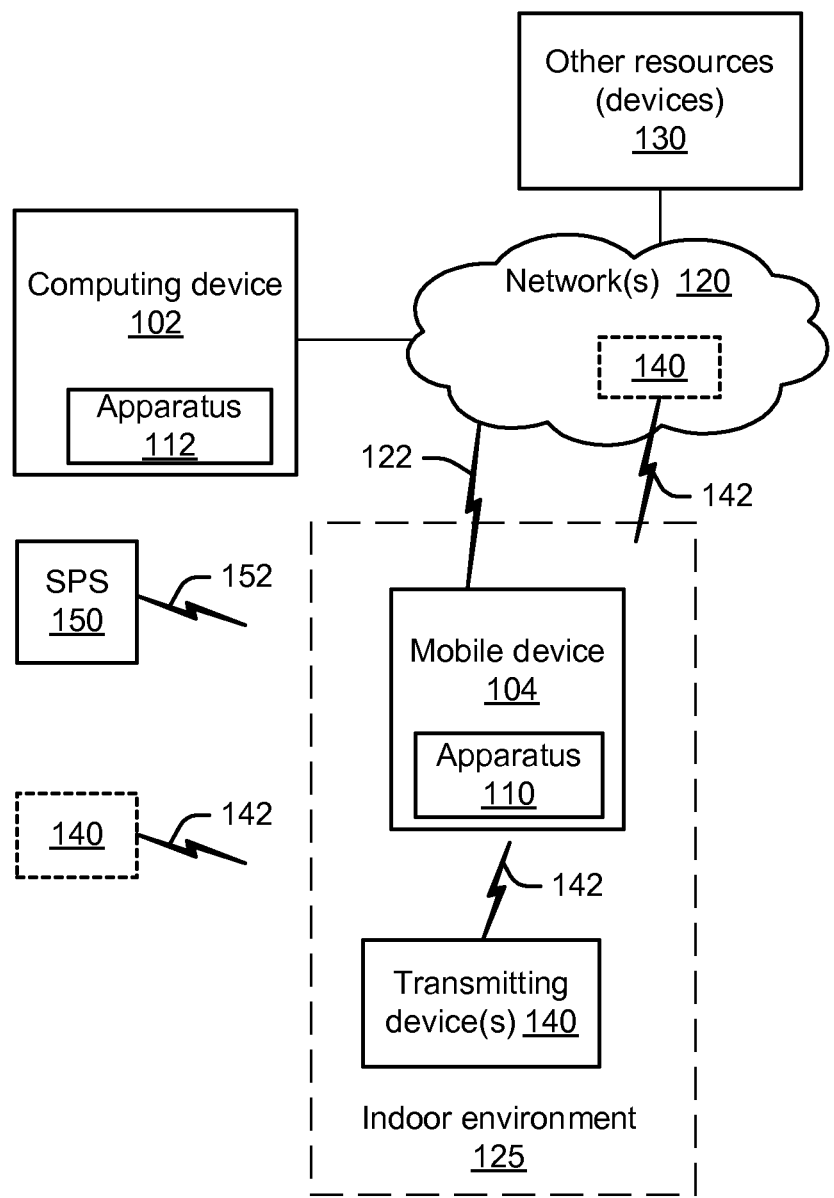
FIG. 1 is a schematic block diagram illustrating an example environment that includes a computing device and a mobile device to adaptively update indoor navigation assistance data (INAD) for use by the mobile device, in accordance with an example implementation.

In certain situations, indoor navigation assistance data (INAD) may be provided to mobile devices from a computing device (e.g., a server, and/or other like electronic devices) through one or more wireless communication links. A mobile device may, for example, store all or part of the received INAD in a local memory. It should be understood, however, that in larger indoor areas, possibly with multiple access points and a plethora of feasible routes and/or points of interest, that the available INAD may be quite voluminous and may significantly tax available bandwidth in wireless communication links and/or data storage space (e.g., memory) on a mobile device. Moreover, it should be understood that in certain instances a mobile device may not actually need nor make use of all or the available INAD.

As illustrated by the examples herein, various methods, apparatuses and articles of manufacture may be implemented for use in one or more computing platforms to adaptively provide INAD update(s) for use by the mobile device. As described in greater detail herein, an INAD update may, for example, comprise a subset of the available INAD as may be selected based, at least in part, on the motion state of the mobile device.

In certain example implementations, a mobile device may determine at least one parameter indicative of a motion state of the mobile device. For example, one or more parameters may characterize a velocity of the mobile device, a heading of the mobile device, a trajectory of the mobile device, a potential route of the mobile device, a likely point of interest (e.g., of potential interest to a user of the mobile device), a motion mode (e.g., inferred by one or more detected motions of the mobile device), and/or the like or some combination thereof. In certain instances, one or more parameters may further be characterized based, at least in part, on one or more user preferences and/or some aspect of a user profile.

Having determined at least one parameter indicative of a motion state of the mobile device, the mobile device may further, for example, transmit one or more requests for an INAD update to one or more computing devices and/or the like. In certain instances, for example, a request for an INAD update may be transmitted to a computing device over one or more wireless and/or wired communication links, and may comprise one or more parameters indicative of a motion state of the mobile device.

A mobile device may, for example, subsequently receive one or more INAD updates from a computing device (e.g., server, etc.). An INAD update may, for example, comprise a subset of (available) INAD for an indoor environment that may be of current use and/or possibly of future use by the mobile device with regard to one or more positioning capabilities (e.g., determining its position, its velocity, etc.) and/or other like processes. A particular subset of INAD provided within one or more INAD updates may, for example, have been selected by the mobile device and/or by the computing device based, at least in part, on one or more of the parameters indicative of the motion state of the mobile device. The one or more parameters may, for example, have been provided or otherwise indicated, at least in part, by the mobile device in one or more transmitted requests for one or more INAD updates.

As described in greater detail herein, an INAD update and/or a subset of INAD provided to a mobile device may be particularly adapted for the mobile device based, at least in part, on some aspect of the mobile device's motion state, e.g., as indicated in one or more parameters and/or otherwise communicated by the request for an INAD update.

For example, in certain instances all or part of a subset of INAD may comprise all or part of the INAD available for a particular "bounded region" that may corresponding a portion in an electronic map of the indoor environment. Here, for example, in certain implementations, a bounded region may be selected to have a particular shape and/or size, which may be determined based, at least in part, on one or more parameters indicative of the motion state of the mobile device.

As described in greater detail herein, in certain instances, a bounded region may, for example, be selected to encompass a position of the mobile device at a current time and/or a likely (e.g., predicted) position of the mobile device at a future time. In certain instances, a bounded region may be selected to encompass all or part of one or more potential routes that a mobile device may follow as a user navigates within the indoor environment. In certain instances, a bounded region may be selected to encompass one or more likely points of interest (e.g., to the user) in a vicinity of the mobile device, and/or with regard to one or more likely destinations of the user.

As described in greater detail herein, in certain example implementations, all or part of a subset of INAD and/or a corresponding bounded region may be adaptively determined and/or otherwise selected by the computing device. In certain example implementations, all or part of a subset of INAD and/or a corresponding bounded region may be adaptively determined and/or otherwise selected by the mobile device (e.g., and identified in a request for an INAD update). In still other example implementations, all or part of the subset of INAD and/or corresponding bounded region may be adaptively determined and/or otherwise selected by a processing distributed on computing platforms are provisioned in the computing device and in the mobile device (e.g., a shared or joint decision process may be implemented between one or more remote computing device(s) and a mobile device).

Having received one or more INAD updates, a mobile device may, for example, determine its position and/or determine other positioning information based, at least in part, on the INAD update. For example, in certain implementations one or more INAD updates and/or for subsets of INAD may comprise one or more map coordinates and/or the like for at least one transmitting device capable of transmitting at least one wireless signal to the mobile device with the mobile device located within the indoor environment. In certain example implementations, one or more INAD updates and/or for subsets of INAD may comprise all or part of a radio heatmap, e.g., characterizing at least one transmitting device. In certain example implementations, one or more INAD updates and/or for subsets of INAD may comprise all or part of a probability heatmap, e.g., characterizing at least one transmitting device. In certain example implementations, one or more INAD updates and/or one or more subsets of INAD may comprise all or part of a connectivity map, e.g., comprising a plurality of interconnected grid points corresponding to positions in an electronic map for at least a portion of the indoor environment. In certain example implementations, one or more INAD updates and/or for subsets of INAD may comprise all or part of a routability graph based, at least in part, on at least a portion of the connectivity map, e.g., the routability graph identifying one or more likely and/or feasible paths within the indoor environment.

As described in greater detail herein, in accordance with certain further aspects, a computing device may obtain INAD for an indoor environment, receive a request for an INAD update from a mobile device, and transmit one or more INAD updates to the mobile device, e.g., wherein at least one of the INAD updates comprises subset of the INAD for the indoor environment selected based, at least in part, on at least one determined parameter indicative of a motion state of the mobile device.

In certain example implementations, a computing device may further determine a frequency or a latency for transmitting one or more subsequent INAD updates to a mobile device, e.g., based, at least in part, on at least one determined parameter indicative of a motion state of the mobile device. In certain example implementations, a computing device may further determine a frequency or a latency for transmitting one or more subsequent INAD updates to a mobile device, e.g., based, at least in part, on a bounded region for at least a portion in an electronic map of the indoor environment, and/or one or more requests for INAD updates. A computing device may, for example, transmit one or more subsequent INAD updates to a mobile device based, at least in part, on a determined frequency or a determined latency.

Attention is drawn next to FIG. 1, which is a schematic block diagram illustrating an example environment 100 that includes a computing device 102 and a mobile device 104, one or more of which implement techniques to adaptively update INAD for use by mobile device 104, in accordance with certain example implementations.

As shown, computing device 102 comprises an apparatus 112 to selectively provide INAD for use by mobile device 104 within an indoor environment 125. Apparatus 112 may represent one or more computing platforms that may communicate with one or more other resources (devices) 130, either directly and/or indirectly, e.g. via one or more network(s) 120. Apparatus 112 may communicate with mobile device 104, either directly and/or indirectly, the latter which is illustrated using network(s) 120 and wireless communication link 122. While computing device 102 happens to be illustrated in this example as being located outside of indoor environment 125, it should be recognized that in certain other implementations, all or part of computing device 102 and/or apparatus 112 may be located within indoor environment 125.

Network(s) 120 may comprise one or more communication systems and/or data networks having various interconnected devices supporting communication between computing device 102 and one or more other resources (devices) 130. As mentioned, network(s) 120 may further support communication between computing device 102 and mobile device 104. For example, communication between computing device 102 and mobile device 104 may allow for certain data and/or instructions to be exchanged there between.

As used herein a "mobile device" may represent any electronic device that may be moved about either directly or indirectly by a user within an indoor environment and which may communicate with one or more other devices via one or more wired and/or wireless communication links. Some examples include a cell phone, a smart phone, a computer (e.g., a personal computer such as a laptop computer, tablet computer, a wearable computer, etc.), a navigation aid, a tracking device, a digital book reader, a gaming device, music and/or video player device, a camera, a machine, a robot, etc.

Other resources (devices) 130 may represent one or more computing platforms from which computing device 102 and/or mobile device 104 may obtain certain data files and/or instructions, and/or to which computing device 102 and/or mobile device 104 may provide certain data files and/or instructions. For example, in certain instances, all or part of an electronic map, INAD, and/or the like may be obtained by computing device 102 and/or mobile device 104 from one or more other resources (devices) 130. For example, in certain instances, all or part of a set of instructions for use in apparatus 112 and/or apparatus 110 may be obtained from other resources (devices) 130.

Example environment 100 further includes a satellite positioning system (SPS) 150 which may transmit one or more SPS signals 152 to mobile device 104. SPS 150 may, for example, represent one or more GNSS, one or more regional navigation satellite systems, and/or the like or some combination thereof. Additionally, one or more terrestrial-based positioning systems may be provided as represented by example transmitting device(s) 140 capable of transmitting one or more wireless signals 142 all or some of which may be used for signal-based positioning. Thus for example, transmitting device(s) 140 may represent a wireless access point, a base station, a repeater, a dedicated beacon transmitting device, just to name a few examples, which have known positions. SPS signals 152 and/or wireless signals 142 may, at times, be acquired by mobile device 104 and used to estimate its position.

In certain implementations, a mobile device 104 may receive or acquire SPS signals 152 from SPS satellites 160. In some embodiments, SPS satellites 160 may be from one global navigation satellite system (GNSS), such as the GPS or Galileo satellite systems. In other embodiments, the SPS Satellites may be from multiple GNSS such as, but not limited to, GPS, Galileo, Glonass, or Beidou (Compass) satellite systems. In other embodiments, SPS satellites may be from any one several regional navigation satellite systems (RNSS') such as, for example, WAAS, EGNOS, QZSS, just to name a few examples.

In certain implementations, mobile device 104 may transmit radio signals to, and receive radio signals from, a wireless communication network (e.g., represented by network(s) 120). In one example, mobile device may communicate with a cellular communication network (e.g., represented by network(s) 120) by transmitting/receiving wireless signals to/from a base station transceiver or the like. Similarly, mobile device 104 may receive wireless signals 142 from one or more transmitting devices 140. In certain instances, mobile device 104 may also transmit wireless signals to one or more transmitting devices 140.

In a particular example implementation, mobile device 104 and/or computing device 102 may communicate with each other and/or other resources (devices) 130 over network(s) 120. As mentioned, network(s) 120 may comprise any combination of wired or wireless links. In a particular implementation, network(s) 120 may comprise an Internet Protocol (IP) infrastructure and/or the like, which may be capable of facilitating communication between mobile device 104, computing device 102 and/or other resources (devices) 130. In another example implementation, network(s) 120 may comprise cellular communication network infrastructure such as, for example, a base station controller or master switching center to facilitate mobile cellular communication with mobile device 104.

In particular implementations, and as discussed below, mobile device 104 may have circuitry and processing resources capable of computing a position fix (e.g., an estimated location) of mobile device 104. For example, mobile device 104 may compute a position fix based, at least in part, on pseudorange measurements to one or more SPS satellites. Here, mobile device 104 may compute such pseudorange measurements based, at least in part, on of pseudonoise code phase detections in SPS signals 152 acquired from one or more SPS satellites. In particular implementations, mobile device 104 may receive SPS positioning assistance data that may aid in the acquisition of SPS signals 152 transmitted by SPS 150 including, for example, almanac, ephemeris data, Doppler search windows, just to name a few examples.

In other implementations, mobile device 104 may obtain a position fix by processing signals received from one or more cellular network transmitting devices and/or the like having known positions (e.g., such as base station transceiver, etc.) using any one of several techniques such as, for example, advanced forward trilateration (AFLT), observed time difference of arrival (OTDOA), etc. In certain example implementations, a range from mobile device 104 may be measured to a plurality of such cellular network transmitting devices, e.g., based, at least in part, on pilot signals transmitted by the cellular network transmitting devices from their known locations and received at mobile device 104. In certain instances, computing device 102, network(s) 120, and/or other resources(devices) 130 may be capable of providing certain forms of cellular network positioning assistance data to mobile device 104, which may include, for example, locations and identities of base transceiver stations, etc., to facilitate certain positioning techniques that might use cellular network signals. For example, a base station almanac (BSA) which indicates locations and identities of cellular base stations in a particular region or regions.

In particular environments, such as indoor environment 125, mobile device 104 may not be capable of acquiring signals from a sufficient number of SPS satellites and/or from a sufficient number of cellular network transmitting devices to effectively perform the requisite processing to efficiently compute a position fix. However, mobile device 104 may be capable of computing a position fix based, at least in part, on one or more wireless signals 142 acquired from transmitting devices 140 (e.g., WLAN access points positioned at known locations, etc.). For example, mobile device 104 may obtain a position fix by measuring ranges to one or more indoor terrestrial wireless access points which are positioned at known locations. Such ranges may be measured, for example, by obtaining a MAC ID address from signals received from such access points and obtaining range measurements to the access points by measuring one or more characteristics of one or more signals received from such access points such as, for example, received signal strength (RSSI) or round trip time (RTT). In alternative implementations, mobile device 104 may obtain an indoor position fix by applying characteristics of acquired signals to a radio heatmap, probability heatmap, and/or the like or some combination thereof indicating expected RSSI and/or RTT signatures at particular locations in the indoor environment.

As described in greater detail herein, in certain instances, computing device 102 may provide one or more INAD updates to mobile device 104 that may be of use in certain indoor positioning techniques based on wireless signals 142 which may be received by mobile device 104 from one or more transmitting devices 140 (e.g., wireless access points, positioning beacon transmitters, etc.) that may or may not be part of a cellular network.

In certain example implementations, an INAD update may indicate locations and identities of one or more transmitting devices 140 positioned at known locations to enable measuring ranges to these transmitters based, at least in part, on a measured RSSI and/or RTT, for example. An INAD update may provide information and/or instructions that may aid indoor positioning operations. For example, an INAD update may indicate locations and identities of one or more transmitting device(s) 140 and/or comprise all or part of one or more radio heatmaps, probability heatmaps, connectivity maps, routability graphs, and/or the like or some combination thereof just to name a few examples. Such INAD updates may, for example, correspond to all or part of one or more electronic maps. In certain instances, such INAD updates and/or electronic maps may be further augmented with metadata relating to certain location based services that may apply to the indoor environment. All or part of an electronic map may, for example, be obtained by mobile device 104 as mobile device 104 enters a particular indoor environment or portion thereof, or possibly in advance. Such an electronic map may be indicative of certain indoor features such as doors, hallways, entry ways, walls, etc., points of interest such as bathrooms, pay phones, room names, stores, etc. By obtaining and displaying such a map and possibly certain metadata corresponding thereto, a mobile device may overlay a current location of the mobile device (and user) over the displayed map to provide the user with additional context, and/or some form of augmented reality capability/experience.

In certain implementations, a connectivity map and/or a routability graph (e.g., corresponding to an electronic map) may assist mobile device 104 in defining feasible areas or spaces for navigation within indoor environment 125, e.g., subject to physical obstructions (e.g., walls) and passage ways (e.g., doorways in walls), etc. Here, for example, by defining feasible areas for navigation, mobile device 104 may apply constraints to aid in the application of filtering measurements for estimating locations and/or motion trajectories according to a motion model (e.g., according to a particle filter and/or Kalman filter). In addition to measurements obtained from the acquisition of signals from local transmitters, according to a particular embodiment, mobile device 104 may further apply a motion model to measurements or inferences obtained from inertial sensors (e.g., accelerometers, gyroscopes, etc.) and/or environment sensors (e.g., magnetometers, temperature sensors, microphones, barometric pressure sensors, ambient light sensors, camera imager, etc.) in estimating a location or motion state of mobile device 104.

In certain example implementations, mobile device 104 may access or otherwise obtain INAD through computing device 102 and/or possibly other resources (devices) 130 via one or more requests. For example, in certain instances one or more requests may be implemented via one or more wired and/or wireless communication links, e.g., using one or more applicable universal resource locators (URLs) for one or more applicable source devices. In accordance with certain aspects presented herein, a mobile device may request an INAD update that may be specifically adapted for one or more particular bounded regions based, at least in part, on one or more parameters that are indicative of a motion state of the mobile device.

It should be understood that the type and/or amount of INAD available for a particular indoor environment may vary, as might the type and/or amount vary for a subset of INAD that may be included in an INAD update. In certain example implementations, available INAD for an indoor environment by cover an entire structure or set of structures within the indoor environment. In other example implementations, available INAD for an indoor environment may be divided or otherwise arranged based on certain aspects of the structure or set of structures within the indoor environment. Thus, for example, available INAD may correspond to all or part of one or more particular floors of one or more buildings, all or part (e.g., wings) of a hospital, all or part of one or more terminals of an airport, all or part of a university campus, all or part of a large shopping mall, just to name a few examples. In certain instances, a request for INAD from mobile device 104 may indicate a rough or course estimate of a position or location of mobile device 104. Mobile device 104 may then be provided INAD covering areas including and/or proximate to the rough or course estimate of the location of mobile device 104. In one particular implementation, a request for INAD from mobile device 104 may specify a location context identifier (LCI) and/or the like. Such an LCI may be associated with a locally defined area such as, for example, a particular floor of a building or other indoor area which is not mapped according to a global coordinate system. In one example server architecture, upon entry of an area, mobile device 104 may request INAD for one or more LCIs covering certain areas and/or adjacent areas. Here, the request from the mobile device 104 may include a rough location of mobile device 104 such that a computing device 102 or other resources (devices) 130 may associate the rough location with certain areas covered by known LCIs, and then transmit those LCIs to mobile device 104. Mobile device 104 may then use the received LCIs in subsequent messages with the same or possibly other devices, e.g., to possibly obtain further INAD foe an area identifiable by one or more of the LCIs.

In accordance with certain aspects as presented in greater detail herein, in certain instances, an INAD update may comprise a subset of INAD that may be adaptively selected based, at least in part, on one or more parameters indicative of a motion state of the mobile device. Thus, for example, such an adaptive INAD update may correspond to a bounded region having a size and/or shape affected by one or more parameters indicative of a motion state of the mobile device. In certain example implementations, a subset of INAD and/or a bounded region for such an INAD update may cover all or part of one or more LCIs.

Consequently, in certain implementations, a mobile device 104 may be capable of obtaining all of the available INAD for a particular indoor environment. However, in certain instances providing all of the available INAD for a particular indoor environment may be less desirable due to certain operative constraints (e.g., communication bandwidth constraints, communication/processing constraints, data storage constraints, etc.). As such, in certain implementations, a mobile device 104 may be capable of obtaining a specific predefined portion of the available INAD for a particular LCI or other like predefined area of an indoor environment. However, once again in certain instances providing all of the available INAD for a particular LCI or other predefined portion of an indoor environment may still prove to be undesirable, again due to certain operative constraints (e.g., communication bandwidth constraints, communication/processing constraints, data storage constraints, etc.). Thus, for example, in certain aspects as presented herein a mobile device 104 may be capable of requesting and obtaining one or more particular subsets of the available INAD for a particular indoor environment as part of an adaptive INAD update. Consequently, in certain instances such an adaptive INAD update may provide for improved performance with regard to certain operative constraints (e.g., communication bandwidth constraints, communication/processing constraints, data storage constraints, etc.).

Figure 2:
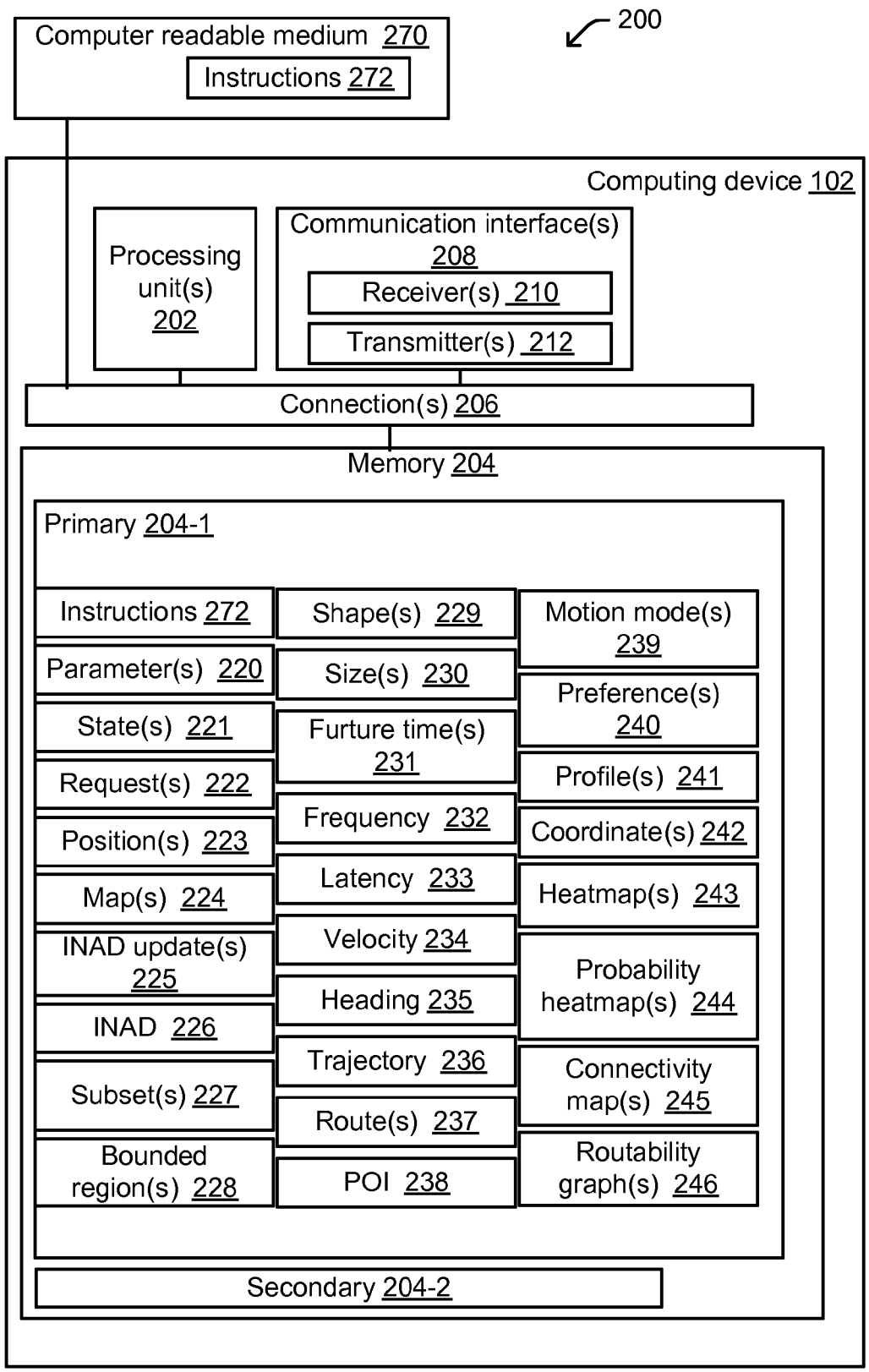
FIG. 2 is a schematic block diagram illustrating certain features of an example computing platform in a computing device to adaptively update INAD for use by the mobile device, in accordance with an example implementation.

Attention is drawn next to FIG. 2, which is a schematic block diagram illustrating certain features of an example computing platform 200 in a computing device 102 to provide INAD to mobile device, e.g., to adaptively update INAD that may be used by the mobile device within an indoor environment, in accordance with an example implementation.

As illustrated computing platform 200 may comprise one or more processing units 202 to perform data processing (e.g., in accordance with the techniques provided herein, as part of apparatus 112, etc.) coupled to memory 204 via one or more connections 206. Processing unit(s) 202 may, for example, be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within computing platform 200. Secondary memory 204-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 270. Memory 204 and/or non-transitory computer readable medium 270 may comprise instructions 272 for use in performing data processing, e.g., in accordance with the techniques and/or example apparatus 112 (FIG. 1) and/or all or part of example process 500 (FIG. 5), as provided herein.

Computing platform 200 may, for example, further comprise one or more communication interface(s) 208. Communication interface(s) 208 may, for example, provide connectivity to network(s) 120, mobile device 104, and/or other resources (devices) 130 (FIG. 1), e.g., via one or more wired and/or wireless communication links. As illustrated here communication interface(s) 208 may comprise one or more receiver(s) 210, one or more transmitter(s) 212, and/or the like or some combination thereof. Communication interface (s) 208 may implement one or more communication protocols as may be required to support one or more wired and/or wireless communication links.

Processing unit(s) 202 and/or instructions 282 may, for example, provide or otherwise make use of one or more signals that may be stored in memory 204 from time to time and which may represent data and/or instructions, such as: instructions 272; one or more parameters 220; one or more motion states 221 of the mobile device; one or more requests 222 for INAD update(s); one or more positions 223 (e.g., past positions, current positions, and/or likely (future) positions of one or more mobile devices); one or more electronic maps 224; one or more INAD updates 225; INAD 226 (e.g., available for a particular indoor environment, available for a particular LCI, etc.); one or more subsets 227 of INAD 226; one or more bounded regions 228; one or more shapes 229 (e.g., of one or more bounded regions); one or more sizes 230 (e.g., of one or more bounded regions); one or more future times 231; a frequency 232 (e.g., indicative of time(s) to transmit one or more INAD updates); a latency 233 (e.g., indicative of a time delay regarding one or more INAD updates to be transmitted); a velocity 234 for a mobile device; a heading 235 for a mobile device; a trajectory 236 for a mobile device; one or more potential routes 237 for a mobile device; one or more likely points of interest 238 (e.g., identifying one or more points of interest with regard to an indoor environment and/or a user of a mobile device); a motion mode 239 (e.g., inferred for a mobile device); one or more preferences 240 (e.g., associated with a mobile device and/or a user of the mobile device); one or more profiles 241 (e.g., associated with a mobile device and/or user of the mobile device or possibly with a group of mobile devices and/or a group of users, historical information regarding one or more mobile devices and/or users, etc.); one or more coordinates 242 (e.g., with regard to a known position for one or more transmitting devices, with regard to an electronic map, etc.); one or more radio heatmaps 243 (e.g., for one or more wireless signals and/or one or more transmitting devices); one or more probability heatmaps 244 (e.g., for one or more wireless signals and/or one or more transmitting devices); one or more connectivity maps 245; one or more routability graphs 246; and/or the like or some combination thereof. It should be kept in line, that in certain example implementations, some types of data may comprise or otherwise be represented at least in part by one or more functions and/or other like computer implementable instructions, e.g., which may be used to calculate certain data values, etc.

Figure 3:
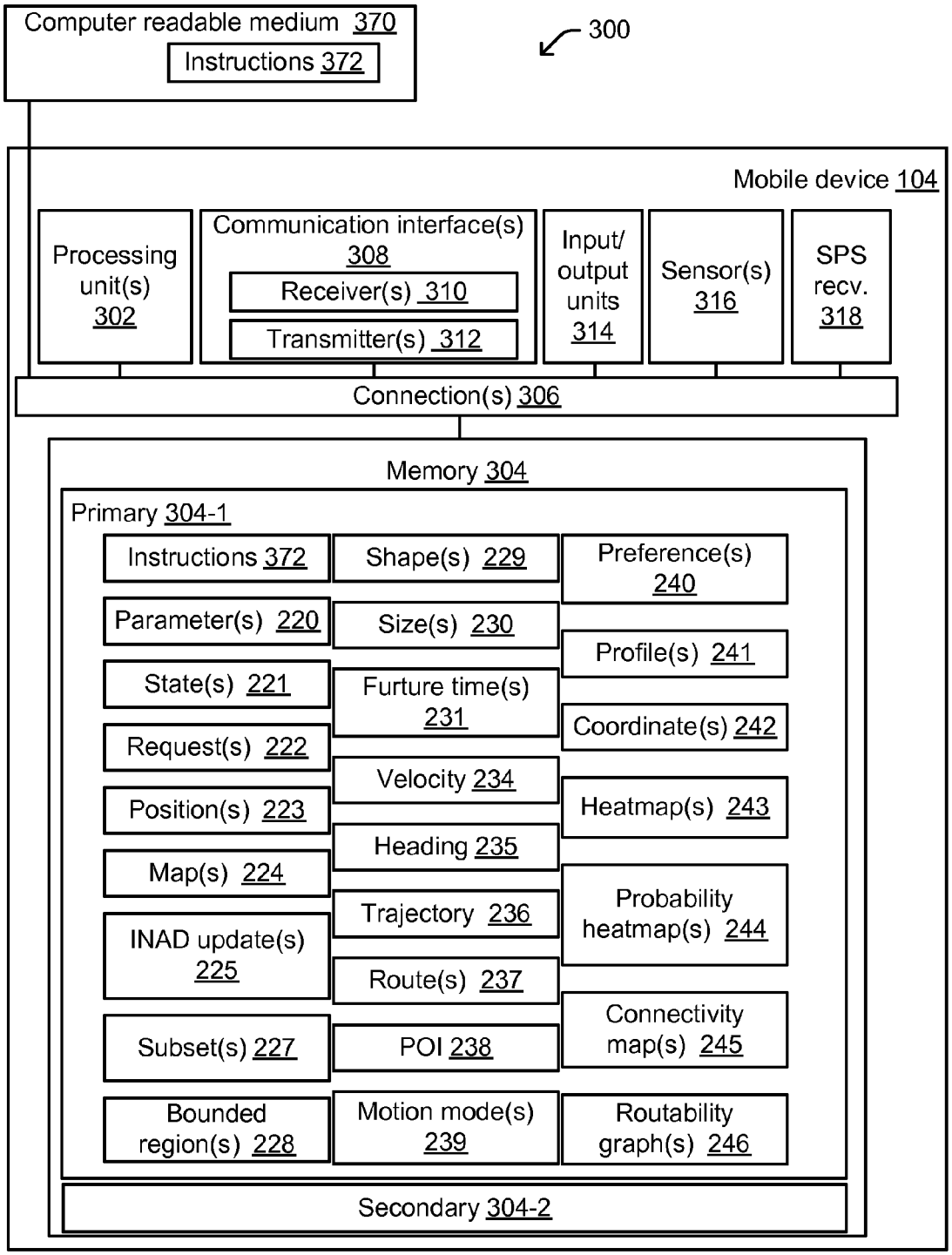
FIG. 3 is a schematic block diagram illustrating certain features of an example computing platform in a mobile device to adaptively update INAD for use by the mobile device, in accordance with an example implementation.

Attention is drawn next to FIG. 3, which is a schematic block diagram illustrating certain features of an example computing platform 300 in a mobile device 104 to adaptively update INAD for use by the mobile device, in accordance with an example implementation.

As illustrated computing platform 300 may comprise one or more processing units 302 to perform data processing (e.g., in accordance with the techniques provided herein, and/or apparatus 110, etc.) coupled to memory 304 via one or more connections 306. Processing unit(s) 302 may, for example, be implemented in hardware or a combination of hardware and software. Processing unit(s) 302 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 304 may be representative of any data storage mechanism. Memory 304 may include, for example, a primary memory 304-1 and/or a secondary memory 304-2. Primary memory 304-1 may comprise, for example, a random access memory, read only memory, etc. While illustrated in this example as being separate from the processing units, it should be understood that all or part of a primary memory may be provided within or otherwise co-located/coupled with processing unit(s) 302, or other like circuitry within mobile device 104. Secondary memory 304-2 may comprise, for example, the same or similar type of memory as primary memory and/or one or more data storage devices or systems, such as, for example, a disk drive, an optical disc drive, a tape drive, a solid motion state memory drive, etc In certain implementations, secondary memory may be operatively receptive of, or otherwise configurable to couple to, a non-transitory computer readable medium 370. Memory 304 and/or non-transitory computer readable medium 370 may comprise instructions 372 for use in performing data processing, e.g., in accordance with the techniques and/or example apparatus 110 (FIG. 1) and/or all or part of one or more example process 400 (FIG. 4, as provided herein.

Computing platform 300 may, for example, further comprise one or more communication interface(s) 308. Communication interface(s) 308 may, for example, provide connectivity to network(s) 120, computing device 102, and/or other resources (devices) 130 (FIG. 1), e.g., via one or more wired and/or wireless communication links. As illustrated here communication interface(s) 308 may comprise one or more receivers 310, one or more transmitters 312, and/or the like or some combination thereof. Communication interface(s) 308 may implement one or more communication protocols as may be required to support one or more wired and/or wireless communication links. Communication interface(s) 308 may, in certain example instances, further comprise one or more receivers capable of receiving wireless signals 142 from one or more transmitting devices 140 of one or more terrestrial-based positioning systems. Further, in certain example instances, mobile device 104 may comprise an SPS receiver 318 capable of receiving and processing SPS signals 152 in support of one or more signal-based positioning capabilities.

In accordance with certain example implementations, communication interface(s) 208, communication interface(s) 308, and/or other resources in network(s) 120 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, communication interface(s) 208 and/or communication interface(s) 308 may further provide for infrared-based communications with one or more other devices. A WLAN may, for example, comprise an IEEE 802.11x network, and a WPAN may comprise a Bluetooth network, an IEEE 802.15x, for example. Wireless communication implementations described herein may also be used in connection with any combination of WWAN, WLAN or WPAN. In another aspect, a wireless transmitting device may comprise a femtocell, utilized to extend cellular telephone service into a business or home. In such an implementation, one or more mobile devices may communicate with a femtocell via a CDMA cellular communication protocol, for example, and the femtocell may provide the mobile device access to a larger cellular telecommunication network by way of another broadband network such as the Internet.

Mobile device 104 may, for example, further comprise one or more input/output units 314. Input/output units 314 may represent one or more devices or other like mechanisms that may be used to obtain inputs from and/or provide outputs to one or more other devices and/or a user of mobile device 104. Thus, for example, input/output units 314 may comprise various buttons, switches, a touch INAD, a trackball, a joystick, a touch screen, a microphone, a camera, and/or the like, which may be used to receive one or more user inputs. In certain instances, input/output units 314 may comprise various devices that may be used in producing a visual output, an audible output, and/or a tactile output for a user.

Mobile device 104 may, for example, comprise one or more sensors 316. For example, sensor(s) 316 may represent one or more inertial sensors, one or more environmental sensors, etc., which may be useful in detecting aspects of the environment 100 and/or mobile device 104. Thus for example, sensor(s) 316 may comprise one or more accelerometers, one or one or more gyroscopes or gyrometers, one or more magnetometers and/or the like, one or more barometers, one or more thermometers, etc. Further, in certain instances sensor(s) 316 may comprise one or more input devices such as a microphone, a camera, a light sensor, etc.

In certain instances, one or more sensors and/or one or more received wireless signals may, for example, be used to infer a "motion mode" of the mobile device. For example, one or more signals generated by one or more sensors and/or one or more characteristics for one or more received wireless signals may be indicative of certain movements of the mobile device which may infer certain types of motion modes. For example, vibrations, movements, changes in direction, etc., as may be detected by one or more inertial sensors and/or environmental sensors on board the mobile device may be compared to or otherwise processed based on one or more models and/or the like to infer a particular motion mode of the mobile device. For example, a pedometer or other like model and/or algorithm may be provided to detect and/or otherwise infer a motion mode indicative of a user walking or possibly running while carrying the mobile device. For example, certain models and/or algorithms may be provided to detect or otherwise infer a motion mode indicative of such a user climbing or descending stairs, ladders, etc. For example, certain models and/or algorithms may be provided to detect or otherwise infer a motion mode indicative of such a user gaining or losing altitude, e.g., as may occur if the user is riding an escalator or elevator. Such motion mode detection/inference techniques and others are well known and beyond the scope of the present description.

Processing unit(s) 302 and/or instructions 372 may, for example, provide or otherwise make use of one or more signals that may be stored in memory 304 from time to time and which may represent data and/or instructions, such as: instructions 372; one or more parameters 220; one or more motion states 221 of mobile device 104; one or more requests 222 for INAD update(s); one or more positions 223, e.g., past, current, and/or likely(future) of mobile device 104; one or more electronic maps 224; one or more INAD updates 225; one or more subsets 227 of INAD; one or more bounded regions 228; one or more shapes 229 (e.g., of one or more bounded regions); one or more sizes 230 (e.g., of one or more bounded regions); one or more future times 231; a velocity 234 of mobile device; a heading 235 of mobile device 104; a trajectory 236 of mobile device 104; one or more potential routes 237 for mobile device 104; one or more likely points of interest 238 (e.g., for a user of mobile device 104); one or more motion modes 239 (e.g., inferred for mobile device 104); one or more preferences 240 (e.g., associated with mobile device 104 and/or user of mobile device 104); one or more profiles 241 (e.g., associated with mobile device 104 and/or a user of mobile device 104, or possibly corresponding to a group of mobile devices and/or and group of users, etc.); one or more coordinates 242 (e.g., with regard to a known position for one or more transmitting devices, etc.); a radio heatmap 243 (e.g., for one or more wireless signals and/or one or more transmitting devices); a probability heatmap 244 (e.g., for one or more wireless signals and/or one or more transmitting devices); one or more connectivity maps 245; one or more routability graphs 246; and/or the like or some combination thereof. It should be kept in line, that in certain example implementations, some types of data may comprise or otherwise be represented at least in part by one or more functions and/or other like computer implementable instructions, e.g., which may be used to calculate certain data values, etc. Additionally, while some the example data and/or instructions as illustrated in FIG. 3 share the same reference numbers as example data and/or instructions as illustrated in FIG. 2, it should be kept in mind that in certain instances all or part of such example data and/or instructions may be distinctly different.

Communication interface(s) 208 and/or 308 may also comprise a wireless transceiver (not shown) which may be capable of transmitting and receiving wireless signals via one or more antennas (not shown), e.g., over network(s) 120 (FIG. 1). Communication interface(s) 208 and/or 308 may enable transmitting and/or receiving signals according to a corresponding multiple wireless communication standards such as, for example, WiFi, CDMA, WCDMA, LTE and Bluetooth, just to name a few examples.

SPS receiver 318 may be capable of receiving and acquiring SPS signals 152 via one or more antennas (not shown). SPS receiver 318 may also process, in whole or in part, acquired SPS signals 152 for estimating a position or location of mobile device 104. In certain instances, SPS receiver 318 may comprise one or more processing unit(s) (not shown), e.g., one or more general purpose processors, one or more digital signal processors DSP(s), one or more specialized processors that may also be utilized to process acquired SPS signals, in whole or in part, and/or calculate an estimated location of mobile device 104. In certain implementations, all or part of such processing of acquired SPS signals may be performed by other processing capabilities in mobile device 104, e.g., processing unit(s) 302, memory 304, etc., in conjunction with SPS receiver 318. Storage of SPS or other signals for use in performing positioning operations may be performed in memory 304 or registers (not shown).

Sensors 316 may generate analog or digital signals that may be stored in memory 304 and processed by DPS(s) (not shown) or processing unit(s) 302 in support of one or more applications such as, for example, applications directed to positioning or navigation operations.

Processing unit(s) 302 may comprise a dedicated modem processor or the like that may be capable of performing baseband processing of signals received and downconverted at receiver(s) 310 of communication interface(s) 308 or SPS receiver 318. Similarly, a modem processor or the like may perform baseband processing of signals to be upconverted for transmission by wireless transmitter(s) 312. In alternative implementations, instead of having a dedicated modem processor, baseband processing may be performed by a general purpose processor or DSP (e.g., general purpose/application processor). It should be understood, however, that these are merely examples of structures that may perform baseband processing, and that claimed subject matter is not limited in this respect.

Figure 4:
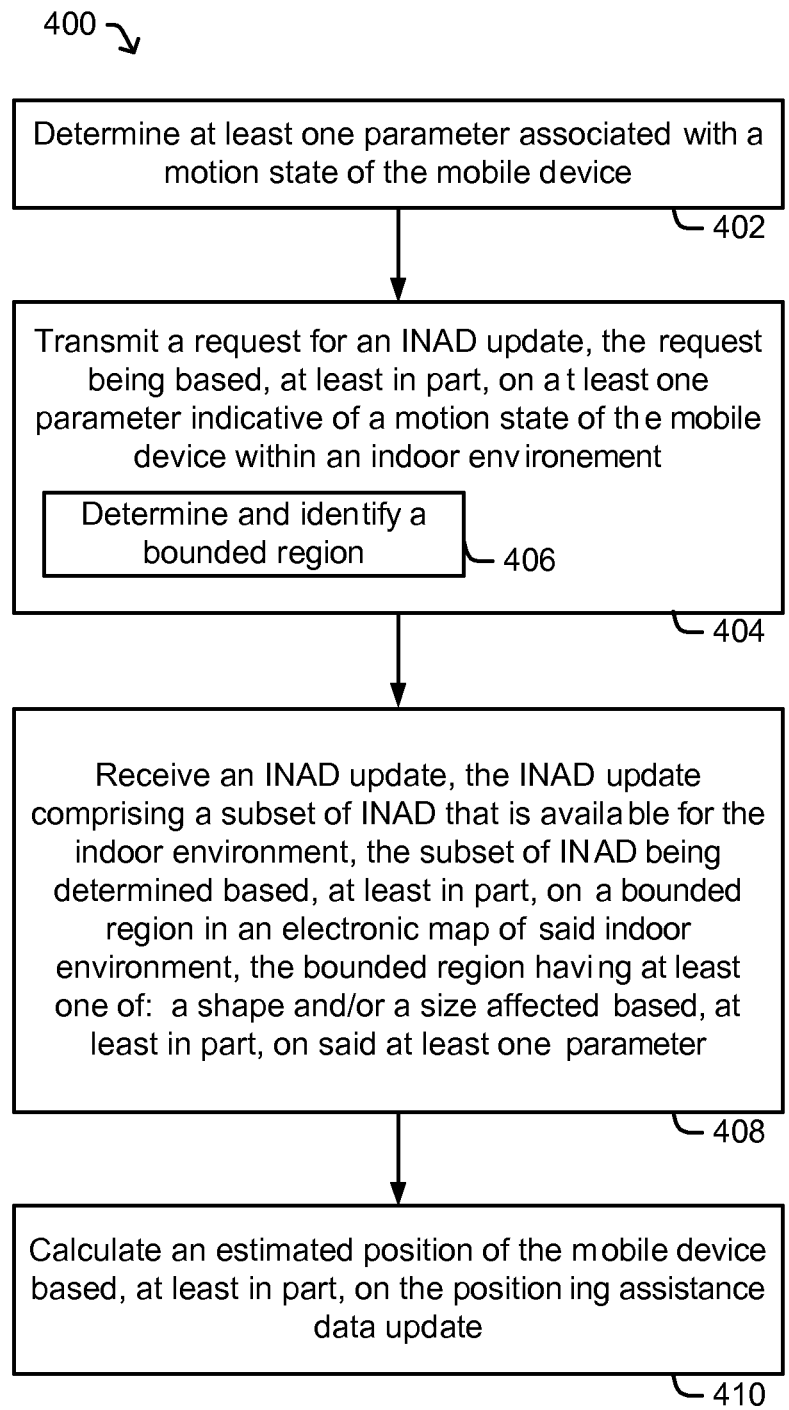
FIG. 4 is a flow diagram illustrating an example process that may be implemented in whole or in part in a computing platform of a mobile device to adaptively update INAD for use by the mobile device, in accordance with an example implementation.

Attention is drawn next to FIG. 4, which is a flow diagram illustrating an example process 400 that may be implemented in whole or in part in a computing platform 300 of a mobile device 104 to adaptively update INAD for use by mobile device 104, in accordance with an example implementation.

At example block 402, at least one parameter indicative of a motion state of the mobile device may be determined. For example, in certain instances, one or more parameters indicative of a motion state of the mobile device may comprise and/or otherwise be based, at least in part, on one or more of a determined velocity, a determined heading, a determined trajectory, an inferred motion mode, a potential route, one or more likely points of interest, certain user preferences, a user profile, and/or the like or some combination thereof, to name a few examples. For example, in certain instances, one or more parameters indicative of the motion state may be determined based, at least in part, on one or more wireless signals received by the mobile device, and/or one or more signals generated by one or more sensors provisioned on the mobile device, and/or one or more user inputs and/or other like stored information, etc.

At example block 404, a request for an INAD update for use by the mobile device in estimating a position of the mobile device within an indoor environment may be transmitted to one or more other devices. For example, in certain implementations a request for an INAD update may take the form of one or more messages transmitted to at least one computing device via one or more wireless communication links, and/or via one or more networks. In accordance with certain implementations, a request for an INAD update may comprise and/or otherwise be based, at least in part, on at least one parameter and/or motion state of the mobile device, e.g. as determined at example block 402. In certain further implementations, at example block 406, a request for an INAD update may further comprise and/or otherwise be indicative of one or more bounded regions as determined by the mobile device. Here, for example, in certain instances mobile device may determine the bounded region based, at least in part, on one or more parameters, e.g., as determined at example block 402. In certain implementations, a bounded region may comprise a particular shape and/or size (e.g. with regard to one or more areas and/or regions identifiable in an electronic map of an indoor region), and which may be affected by the one or more parameters. In certain implementations, a bounded region identified in a request for an INAD update may be selected, at least in part, to adaptively identify INAD that may be useful to the mobile device at a current time and/or one or more future times. For example, in certain implementations, a bounded region may comprise a specific size and/or shape of an indoor environment for which one or more specific subset(s) of INAD may of particular use by one or more positioning functions within the mobile device, and which may be obtained by the mobile device through one or more (timely) INAD updates. Hence, as illustrated in additional examples below, in certain implementations INAD may be updated over time for a series of bounded regions that may relate to a potential route that a mobile device may be following within an indoor environment. It should be kept in mind, however, that in other example implementations, computing device 102, and/or other like computing devices, may be capable of determining all or part of one or more bounded regions for the mobile device.

At example block 408, one or more INAD updates may be received, e.g., via one or more messages transmitted by one or more computing devices. In certain instances, an INAD update may be transmitted by computing device 102 in response to a request for an INAD update, e.g., as transmitted by the mobile device at block 404. In certain instances, a computing device 102 may selectively schedule and transmit one or more INAD updates based on some determined frequency and/or latency. In certain instances, a computing device 102 may selectively transmit one or more INAD updates independent of a request for an INAD update from a mobile device. AN INAD update may, for example, comprise a subset of INAD for the indoor environment which has been selected based, at least in part, on one or more parameters indicative of the motion state of the mobile device, and/or the motion state of the mobile device. In accordance with certain example implementations, an INAD update may comprise all or part of one or more radio heatmaps, probability heatmaps, connectivity maps, routability graphs, and/or the like or some combination thereof just to name a few examples.

At example block 410, a current position of the mobile device may be determined based, at least in part, on use of the INAD update. Here, for example, one or more positioning functions and/or other like capabilities provisioned in the mobile device may make use of all or part of one or more INAD updates in determining its position, velocity, heading, trajectory, likely route(s), etc., e.g., based on one or more acquired wireless signals, and/or possibly one or more signals generated by one or more onboard sensors.

Figure 5:
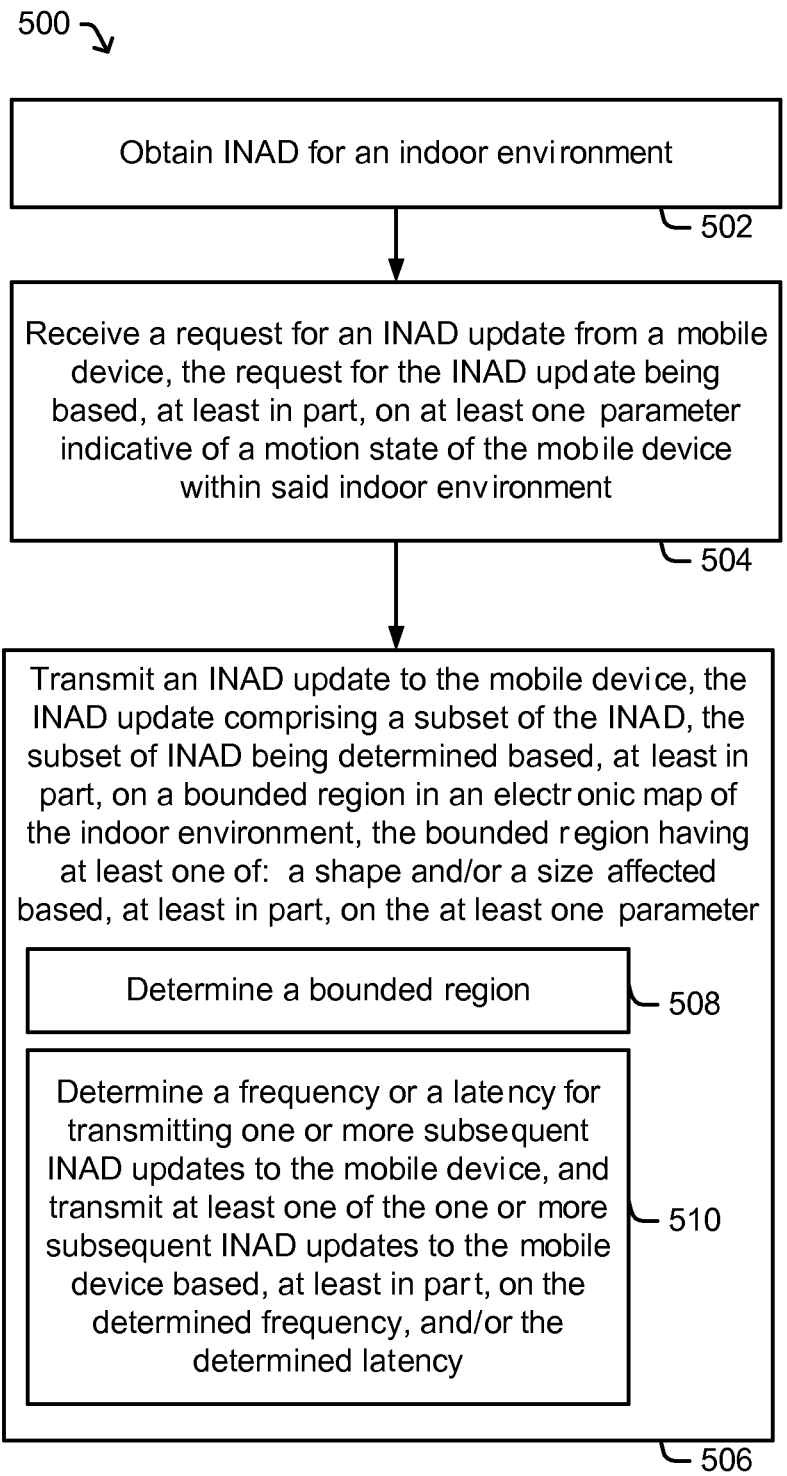
FIG. 5 is a flow diagram illustrating an example process that may be implemented in whole or in part in a computing platform of a computing device to adaptively update INAD for use by a mobile device, in accordance with an example implementation.

Attention is drawn next to FIG. 5, which is a flow diagram illustrating an example process 500 that may be implemented in whole or in part in a computing platform 200 of a computing device 102 to adaptively update INAD for use by a mobile device 104, in accordance with an example implementation.

At example block 502, INAD for an indoor environment may be obtained. Example, in certain implementations, a computing device may obtain INAD from one or more other resources (devices) 130 and/or one or more transmitting devices 140, directly or via network(s) 120 over one or more wired and/or wireless communication links (see FIG. 1). For example, in certain implementations, INAD may comprise various forms of information that may be of use by a mobile device in estimating its position and/or other like motion information with regard to all or part of one or more indoor environments based, at least in part, on one or more wireless signals transmitted one or more transmitting devices and/or one or more signals generated by one or more sensors on board the mobile device. Thus, by way of example, in certain implementations INAD may comprise a radio heatmap indicative of one or more transmitting devices, a probability heatmap indicative of one or more transmitting devices, a connectivity map indicative of all or part of an indoor environment, the routability graph for all or part of an indoor environment, and/or the like or some combination thereof just to name a few examples.

At example block 504, a request for an INAD update may be received from a mobile device. Here, for example, an INAD update may take the form of one or more messages transmitted, at least initially, over one or more wireless communication links from the mobile device directly to the computing device, and/or indirectly to the computing device via one or more network(s). In accordance with certain implementations, a request for an INAD update may comprise and/or otherwise be based, at least in part, on one or more parameters indicative of a motion state of the mobile device. In certain implementations, the motion state of the mobile device may be indicative of a current determined motion state of the mobile device. In certain other implementations, the motion state of the mobile device may be indicative of an anticipated motion state of the mobile device at a future time. In certain implementations, a request for an INAD update may comprise and/or otherwise be indicative of one or more bounded regions identifiable in an electronic map of an indoor environment. Here, for example, a bounded region may comprise a particular shape and/or size, which may be adapted for the mobile device based on its current determined motion state and/or an anticipated motion state(s). In certain example implementations a bounded region may be identified directly or indirectly using one or more coordinate values, labeled features, and/or the like that may be identifiable in an electronic map. For example, a bounded region may be directly identified by specifying certain grid points, a latitude, a longitude, one or more LCIs, one or more map tiles, one or more floors, one or more rooms/spaces, etc. For example, a bounded region may be indirectly identified by specifying certain distances, angles, geometric shapes, motions/movements, etc., that may be applied to an electronic map along with a position to determine certain grid points, latitude, longitude, LCI(s), map tile(s), floor(s), room(s), space(s), etc. Accordingly, a bounded region may take the form of various two-dimensional or three-dimensional shapes. In certain example implementations, all or part of a shape of a bounded region may comprise a polygon, or other shape having at least one straight side. In certain example implementations, a shape of a bounded region may comprise a curved or other non-straight edge.

By way of example, a request for an INAD update may comprise and/or be based, at least in part, on a determined velocity, a determined heading, a determined trajectory, an inferred motion mode, a potential route, a likely point of interest, a user preference, a user profile, and/or the like or some combination thereof associated with a mobile device and/or its user. For example, in certain instances, one or more parameters indicative of the motion state may be determined based, at least in part, on one or more wireless signals received by the mobile device, and/or one or more signals generated by one or more sensors provisioned on the mobile device, and/or one or more user inputs and/or other like stored information, etc.

At example block 506, one or more INAD updates may be transmitted to the mobile device. Here, for example, an INAD update may comprise a subset of the INAD for the indoor environment, which may be selected by the computing device based, at least in part, on at least one parameter indicative of a motion state of the mobile device. Here, for example, a subset of the INAD may be determined based, at least in part, on a bounded region having at least one of: a shape and/or a size that may be affected based, at least in part, on at least one parameter indicative of a motion state of the mobile device.

In accordance with certain implementations, a request for an INAD update may comprise and/or otherwise identify one or more bounded regions as determined by mobile device, and as such a corresponding INAD update may comprise all or part of one or more subsets of INAD characterizing the identified bounded region(s). In accordance with certain other implementations, at example block 508, the computing device may itself determine one or more bounded regions in response to a request for an INAD update.

In certain instances, for example, at example block 510, computing device 102 may determine a frequency, a latency, and/or the like or some combination thereof for in scheduling the transmission of one or more INAD updates to the mobile device. For example, computing device 102 may determine that one or more further INAD updates may be transmitted to the mobile device at one or more future times based, at least in part, on a prediction that such further INAD update(s) may be of use to the mobile device at such future time(s). For example, a trajectory of a mobile device, a potential route of the mobile device, etc., may be taken into account to predict the mobile device's position at a future time and to identify certain INAD that may be of use to the mobile device at such a future time. Also, at example block 510, at least one of the one or more INAD updates may be subsequently transmitted to the mobile device based, at least in part, on the determined frequency, the determined latency, and/or the like or some combination thereof.

Figure 6:
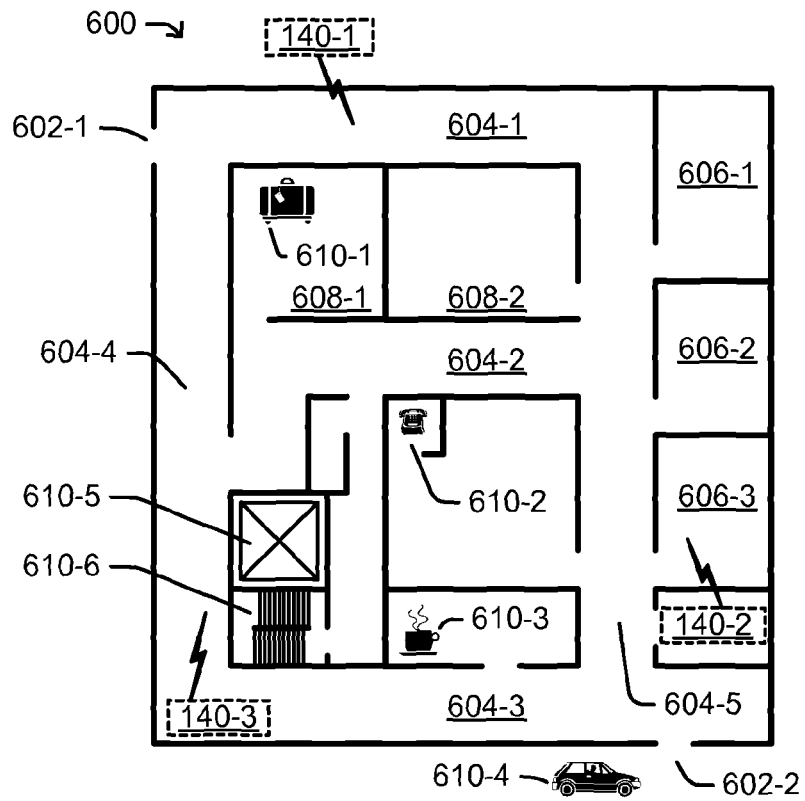
FIG. 6 is an illustrative diagram showing certain features that may be identified in an electronic map for an indoor environment, a plurality of wireless signal transmitting devices capable of communicating with mobile devices within the indoor environment, and certain potential points of interest to a user of a mobile device with regard to the indoor environment, in accordance with an example implementation.

Attention is drawn next to FIG. 6, which is an illustrative diagram showing certain features that may be identified within an electronic map for an example indoor environment represented by a floor plan 600. As shown, floor plan 600 may identify a plurality of indoor regions separated by various features, such as walls, floors, ceilings, etc. In this simple example, floor plan 600 includes two entry ways 602-1 and 602-2, through which users of mobile devices may enter and/or exit the illustrated indoor environment. Floor plan 600 includes a plurality of hallways 604-1, 604-2, 604-3, 604-4, and 604-5, which interconnect a plurality of rooms and/or other features. For example, hallways 604-1 and 604-4 may be entered via entry way 602-1, and always 604-3 in 604-5 may be entered via entryway 602-2. Hallways 604-1, 604-2 and 604-3 each separately connect hallway 604-4 with hallway 604-5. Hallway 604-5 provides access to offices 606-1, 606-2, and 606-3, as well as to example internal room 608-2. Hallway 604-2 provides access to internal room 608-1 within which a point of interest (luggage) 610-1 may be located, and to further example points of interest (elevator) 610-5 and (staircase) 610-6. Hallway 604-5 provides access to another internal room in which an example point of interest (telephone) 610-2 may be located. Hallway 604-3 provides access to another internal room which example point of interest (coffeemaker) may be located. Additionally, as illustrated in example point of interest (transportation) 610-4 that may or may not be within an indoor environment may be provided in a vicinity near entryway 602-2.

A plurality of transmitting devices 140 are also illustrated in floor plan 600. As in FIG. 1, transmitting devices 140 may transmit wireless signals that may be received by the mobile device within all or part of the indoor environment. Here, for example, transmitting device 140-1 is illustrated as being located outside of floor plan 600, while transmitting devices 140-2 and 140-3 are illustrated as being located inside of floor plan 600. More particularly, transmitting device 140-2 is illustrated with in an example equipment room located off of hallway 604-5, and transmitting device 140-3 is illustrated as being located at the corner where hallways 604-3 and 604-4 meet.

Figure 7:
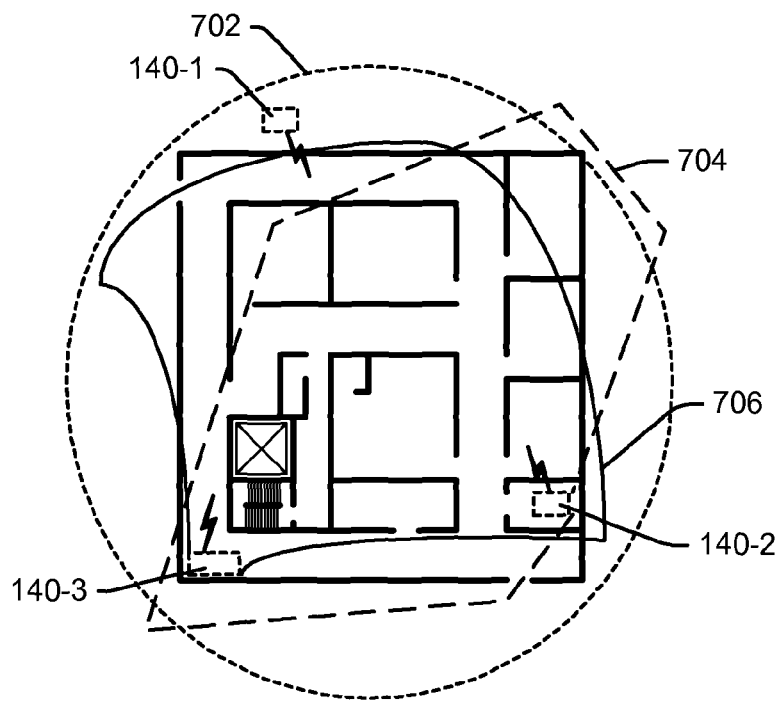
FIG. 7 is an illustrative diagram similar to that of FIG. 6, and further showing example coverage areas for each of the example wireless signal transmitting devices capable of communicating with mobile devices within the indoor environment and which may relate to radio heatmap data, probability heatmap data, and/or the like or some combination thereof, in accordance with an example implementation.

With this in mind, FIG. 7 is an illustrative diagram similar to that of FIG. 6, and further showing example useful coverage areas 702, 704 and 706 for each of the example transmitting devices 140-1 140-2, and 140-3, respectively, for a mobile device within an indoor environment corresponding to floor plan 600. As illustrated, in certain instances, a transmitting device such as transmitting device 140-1 may provide a useful coverage area that includes the entire floor plan 600, while the useful coverage area of other transmitting devices (e.g. 140-2 and 140-3) may be limited to certain portions of floor plan 600. As illustrated, a useful coverage area may relate to variety of different shapes and/or patterns, e.g., depending on the setup and/or operation of the particular transmitting device, and/or certain features within the indoor environment, etc. all or part of the illustrated useful coverage area for one or more of the transmitting devices may also be indicative of various INAD and/or subsets thereof which may be of use to the mobile device. Example, all or part of the useful coverage area may comprise heatmap data, probability heatmap data, and/or the like or some combination thereof.

Figure 8:
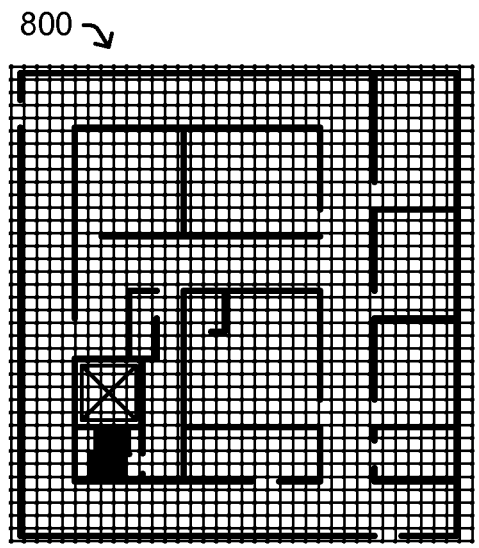
FIG. 8 is an illustrative diagram similar to that of FIG. 6, and further showing an example interconnected grid of points overlaying certain features of an electronic map, in accordance with an example implementation.

Attention is drawn next to FIG. 8, which is an illustrative diagram similar to that of FIG. 6, and further showing an example interconnected grid of points 800 overlaying certain features of an electronic map, in accordance with an example implementation. Interconnected grid of points 800 is illustrated as having a simple square grid pattern in which grid points are arranged in a two-dimensional array and interconnected via vertical and horizontal edges. In other example implementations, a similar grid pattern may also and/or alternatively include diagonal edges. Indeed, it should be kept in mind that other patterns may be implemented, some of which may be uniform and others which may be nonuniform in one or more of the dimensions. Further still, in certain implementations, a three-dimensional grid pattern may be implemented.

Figure 9:
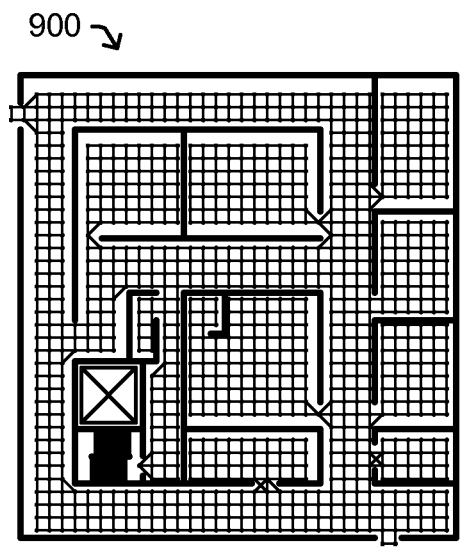
FIG. 9 is an illustrative diagram similar to that of FIG. 8, and further showing an example connectivity map based, at least in part, on an interconnected grid of points and certain features of an electronic map, in accordance with an example implementation.

Attention is drawn next to FIG. 9, which is an illustrative diagram similar to that of FIG. 8, and further showing an example connectivity map 900 based, at least in part, on an interconnected grid of points and certain features of an electronic map, in accordance with an example implementation. Here, as illustrated, one or more of the grid points may be further connected via one or more diagonal edges. In this example, it should be recognized that none of the edges between grid points or nodes is allowed to cross over a features such as a wall. Hence, it should be a case that a user carrying a mobile device will navigate through such an indoor environment along some route that may be represented or otherwise modeled by a plurality of interconnected nodes and edges.

Figure 10:
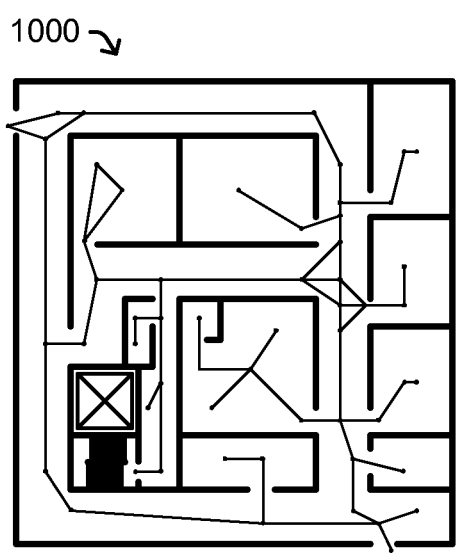
FIG. 10 is an illustrative diagram similar to that of FIGS. 8 and 9, and further showing an example routability graph map based, at least in part, on an example connectivity map, in accordance with an example implementation.

Attention is drawn next to FIG. 10, which is an illustrative diagram similar to that of FIGS. 8 and 9, and further showing an example routability graph 1000 based, at least in part, on example connectivity map 900, in accordance with an example implementation. Here, certain selected nodes are preserved and connected with other nodes by way of a line segment which is intended to represent or otherwise model a likely navigation by a user within the indoor environment. In this illustrated example, a routability graph 1000 is intended to represent a reduced set of data when compared to example connectivity graph 900. As may be appreciated, under certain conditions routability graph 1000 may be represented by a data file that is smaller than a corresponding data file for example connectivity graph 900.

Figure 11:
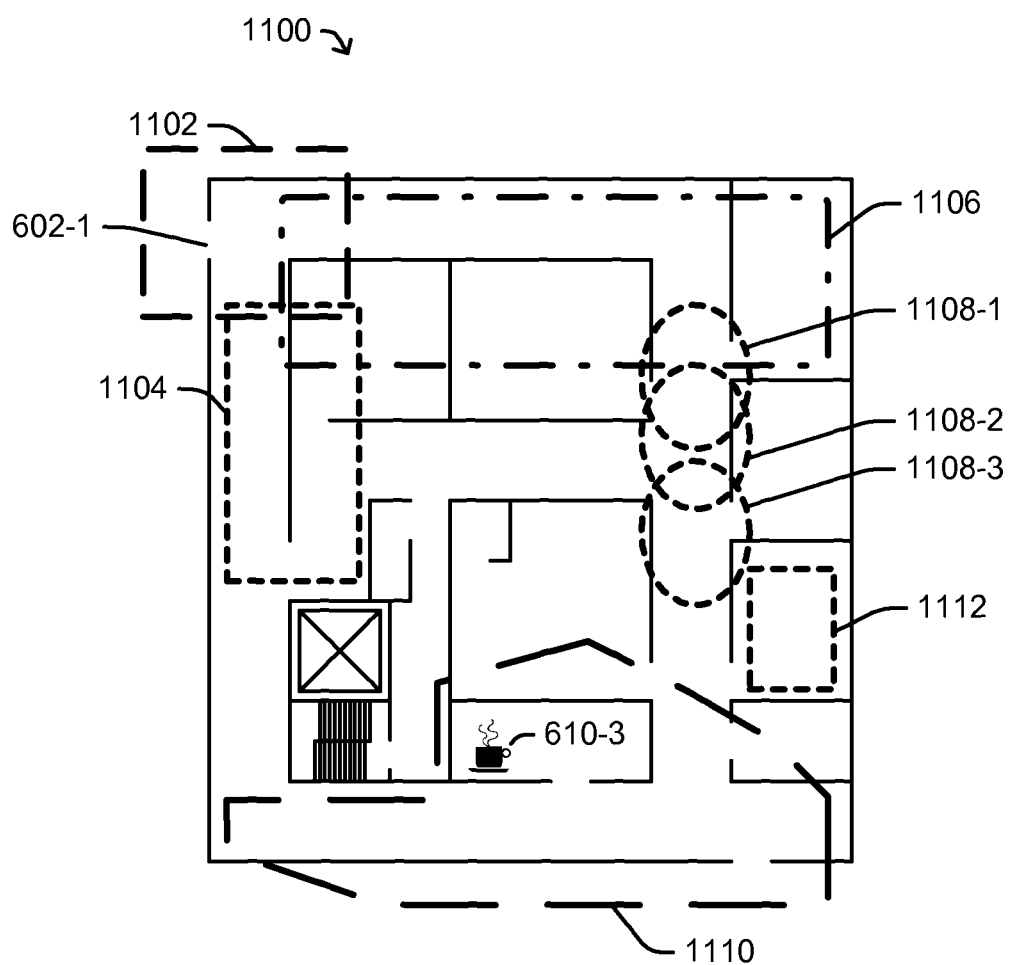
FIG. 11 is an illustrative diagram similar to that of FIG. 6, and further showing example bounded regions, some of which may overlap one another, and each of which may have one or more corresponding subset(s) of INAD, and which may be adaptively determined to update INAD available at a mobile device, in accordance with an example implementation.

Attention is drawn next to FIG. 11, which is an illustrative diagram 1100 similar to that of floor plan 600, and further showing certain example bounded regions, some of which may overlap one another, and each of which may have at least one corresponding subset of INAD, and which may be adaptively determined to update INAD available at a mobile device, in accordance with an example implementation.

Example bounded region 1102 illustrates an initial bounded region that may be of use for a mobile device with regard to entryway 602-1. Here, for example, an INAD update may be requested and/or otherwise provided to a mobile device prior to its entering or shortly after entering the indoor environment. Such an INAD update may, for example, provide INAD that may be used to identify whether the mobile device has entered the indoor environment and possibly determine a potential (initial) route within the indoor environment. Here, for example, bounded region 1102 may indicate and/or otherwise infer certain INAD that may be used to determine whether the mobile device is likely to be moving into bounded region 1104 or bounded region 1106, which essentially lead away from bounded region 1102 in different directions, not on similar to the always within the illustrated floor plan.

As illustrated by bounded regions 1102, 1104 and 1106, there may be an overlap between certain bounded regions. Further, as illustrated, example bounded regions 1104 and 1106 may overlap all or part of one or more hallways, rooms, etc., that may be represented within an electronic map of an indoor environment. In certain other implementations, as illustrated by example bounded region 1112, a bounded region may relate to all or part of one room or other identifiable space within an electronic map for an indoor environment.

Example bounded regions 1104 and 1106, which have different shapes/sizes may be of further use to mobile device depending upon its movement within the indoor environment. Although illustrated as relating to different physically sized regions of the indoor environment, it may be the case that, in certain implementations, INAD updates for bounded regions 1104 and 1106 may comprise the same or similar amounts of transmitted data. In other words, for example, it may be beneficial for an INAD update for bounded region 1104 to provide additional and/or different INAD (e.g., more data per square meter) then for bounded region 1106 given the navigational options within the floor plan, certain applicable points of interest, certain routes, and/or possibly given the signaling characteristics within the indoor environment for bounded region 1104.

Bounded regions 1108-1, 1108-2 and 1108-3 are presented by way of an example of a plurality of bounded regions that may be determined for a mobile device moving along a hallway, etc. Here, for example, an INAD update for bounded region 1108-1 may be provided to a mobile device at a time T1, an INAD update for bounded region 1108-2 may be subsequently provided to the mobile device at a time T2, and an INAD update for bounded region 1108-3 may be subsequently provided to the mobile device at a time T3. Here, for example, such INAD updates may be provided in response to one or more requests from the mobile device. In certain instances, a subsequent INAD updates may be provided based on some schedule and/or the like, e.g., accordance with a frequency value and/or latency value. In certain example implementations, a frequency value and/or latency value may be determined based, at least in part, on one or more parameters and/or a motion state of the mobile device. For example, a frequency may be based on a velocity, a trajectory, a motion mode, etc., which may be indicative of the proper timing for transmission of an INAD update to the mobile device. Consequently, an INAD update may, for example, be adapted with regard to a boundary region's size/shape, certain content, and/or transmission timing based, at least in part, on information regarding the motion state of the mobile device.

For example, a comparison may be made between two example INAD updates. In the first example INAD update let us assume that the mobile device is determined to be in a first motion state, and in the second example INAD update let us assume that the mobile device is determined to be in a second motion state that is different in some manner from the first motion state. For example, let us assume that the mobile device is moving with a first velocity in the first motion state and a second velocity in the second motion state, and that the second velocity is greater than the first velocity. In certain implementations, given such assumptions, it may be beneficial for the first example INAD update to support a finer resolution of position determination that the second example INAD update, since the mobile device in the first motion state is moving slower. Thus, in certain implementations, such a first example INAD update may comprise more or additional/other data than might such a second example INAD update. Thus, in certain implementations such a first example INAD update may or may not correspond to a smaller bounded region than might such a second example INAD update. In certain implementations, such a first example INAD update may cover a bounded region within all or part of a particular hallway or room. In certain implementations, such a first example INAD update may not be followed up with a subsequent INAD update, e.g., scheduled at some future time.

Continuing with the preceding assumptions, in certain implementations, such a second example INAD update may comprise less or limited data than might such a first example INAD update, e.g., since the mobile device in its second motion state may be moving rather quickly through the indoor environment relative to its first motion state. Thus, in certain implementations such a second example INAD update may or may not correspond to a smaller bounded region than might such a first example INAD update. In certain implementations, such a second example INAD update may cover a bounded region within all or part of one or more particular hallways or rooms. In certain implementations, such a second example INAD update may be followed up with one or more subsequent INAD updates, e.g., scheduled at some future times.

As illustrated by the preceding assumed examples, an INAD update may be adapted based on a variety of different factors, including, for example, one or more parameters and/or motion states of the mobile device. In certain instances, one or more parameters and/or motion states of the mobile device may be indicative that one or more subsets of INAD may be of particular current use and/or possible use in the future.

In certain instances, one or more INAD updates may be adapted to provide a mobile device with an adequate amount of INAD in a timely manner, with one potential goal being to make efficient use of available computing, data storage and/or communication resources. Thus, for example, it may be beneficial to adaptively select and/or adaptively provide certain INAD updates based on a "just in time" or other like efficient delivery/scheduling methodology. As illustrated by way of the examples herein, certain INAD updates may be adaptively selected and/or adaptively transmitted based on one or more parameters and/or motion states of the mobile device. A motion state of a mobile device may, for example, correspond in some manner to various motions/movements of the mobile device. A motion state of the mobile device may, for example, correspond in some manner to various preferences of a user of the mobile device. A motion state of the mobile device may, for example, correspond in some manner to profile information associated with a user of the mobile device and/or one or more other like users of one or more other like mobile devices, etc. A motion state of the mobile device may, for example, correspond in some manner to one or more features and/or points of interest with regard to an indoor environment, the mobile device, a user of the mobile device, and/or the like or some combination thereof.

AN INAD update may, for example, correspond to one or more bounded regions within an indoor environment, e.g. as determined by the mobile device and/or the computing device. A bounded region may, for example, be selected based, at least in part, on one or more parameters and/or a motion state of the mobile device. A bounded region may, for example, be adapted based on one or more parameters and/or motion state of the mobile device, and/or possibly certain features and/or points of interest of an indoor environment. For example, bounded region 1110 in FIG. 11, illustrates a bounded region which may have been selectively adapted to include not only in entryway and hallway but also an example point of interest (coffeemaker) 610-3 that is located in an interior room.

In certain example implementations, a bounded region may be adaptively selected based, at least in part, a connectivity map and/or routability graph for all or part of an electronic map of an indoor environment. In certain example implementations, a bounded region may be adaptively selected based, at least in part, on a distribution of points of interest and/or the like identified in an electronic map and/or metadata associated there with. In certain example implementations, a bounded region may be adaptively selected based, at least in part, on a likelihood of a user's route or other movements based on previous movements and/or related statistical information regarding previous movements of the user and/or one or more other users. A bounded region may be adaptively selected based, at least in part, on one or more other bounded regions.

Certain further example implementations, a parameter indicative of a motion state of the mobile device and/or the motion state of a mobile device may be based, at least in part, on one or more internal computing, data storage, and/or communication capabilities/limitations, etc. Thus, for example, one or more parameters and/or a motion state of the mobile device may be indicative that a mobile device may benefit from an INAD update adaptively selected to accommodate one or more internal computing, data storage, and/or communication capabilities/limitations, etc., of the mobile device, e.g. in a particular time.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing," "computing," "calculating," "determining", "establishing", "obtaining", "identifying", "applying," and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, with a mobile device:
   transmitting a request for an indoor navigation assistance data (INAD) update, said request for said INAD update being based, at least in part, on at least one parameter indicative of a motion state of said mobile device within an indoor environment; and
   receiving said INAD update, said INAD update comprising a subset of INAD that is available for said indoor environment, said subset of INAD being determined based, at least in part, on a bounded region in an electronic map of said indoor environment, said bounded region having at least one of: a shape and/or a size affected based, at least in part, on said at least one parameter indicative of said motion state of said mobile device within said indoor environment and a profile indicative of a likelihood of subsequent movements of said mobile device determined, at least in part, on previous movements of one or more other mobile devices, said bounded region being identified by specifying at least one of the following: a grid point; a latitude; a longitude; a location context identifier (LCI); a map tile; a floor; a room; a distance; an angle; a geometric shape; or any combination thereof.

2. The method as recited in claim 1, wherein said bounded region is selected based, at least in part, to encompass a likely position of said mobile device at a future time.

3. The method as recited in claim 1, wherein said bounded region is selected based, at least in part, to encompass one or more points of interest in a vicinity of said mobile device.

4. The method as recited in claim 1, and further comprising, with said mobile device:
   determining said bounded region; and
   identifying said bounded region in said request for said INAD update.

5. The method as recited in claim 1, and further comprising, with said mobile device:
   determining a position of said mobile device based, at least in part, on said INAD update.

6. The method as recited in claim 1, wherein said at least one parameter indicative of said motion state of said mobile device within said indoor environment is indicative of at least one of: a velocity of said mobile device; a heading of said mobile device; a potential route of said mobile device; a likely point of interest; a motion mode; a user preference; or a user profile.

7. The method as recited in claim 1, wherein said subset of INAD comprises a radio heatmap for at least one transmitting device.

8. The method as recited in claim 1, wherein said subset of INAD comprises a probability heatmap for at least one transmitting device.

9. The method as recited in claim 1, wherein said subset of INAD comprises a connectivity map indicative of a plurality of interconnected grid points corresponding to positions in said electronic map for at least a portion of said indoor environment.

10. The method as recited in claim 1, wherein said subset of INAD comprises a routability graph based, at least in part, on at least a portion of a connectivity map, said routability graph indicating one or more feasible paths within said indoor environment.

11. An apparatus for use in a mobile device, the apparatus comprising:
   means for transmitting a request for an indoor navigation assistance data (INAD) update, said request for said INAD update being based, at least in part, on at least one parameter indicative of a motion state of said mobile device within an indoor environment; and
   means for receiving said INAD update, said INAD update comprising a subset of INAD that is available for said indoor environment, said subset of INAD being determined based, at least in part, on a bounded region in an electronic map of said indoor environment, said bounded region having at least one of: a shape and/or a size affected based, at least in part, on said at least one parameter indicative of said motion state of said mobile device within said indoor environment and a profile indicative of a likelihood of subsequent movements of said mobile device determined, at least in part, on previous movements of one or more other mobile devices, said bounded region being identified by specifying at least one of the following: a grid point; a latitude; a longitude; a location context identifier (LCI); a map tile; a floor; a room; a distance; an angle; a geometric shape; or any combination thereof.

12. The apparatus as recited in claim 11, wherein said bounded region is selected based, at least in part, to encompass a likely position of said mobile device at a future time.

13. The apparatus as recited in claim 11, wherein said bounded region is selected based, at least in part, to encompass one or more points of interest in a vicinity of said mobile device.

14. The apparatus as recited in claim 11, and further comprising, with said mobile device:
means for determining said bounded region; and
means for identifying said bounded region in said request for said INAD update.

15. The apparatus as recited in claim 11, and further comprising, with said mobile device:
means for determining a position of said mobile device based, at least in part, on said INAD update.

16. The apparatus as recited in claim 11, wherein said at least one parameter indicative of said motion state of said mobile device within said indoor environment is indicative of at least one of: a velocity of said mobile device; a heading of said mobile device; a potential route of said mobile device; a likely point of interest; or a motion mode.

17. The apparatus as recited in claim 11, wherein said subset of INAD comprises at least one of:
a radio heatmap for at least one transmitting device;
a probability heatmap for at least said at least one transmitting device;
a connectivity map indicative of a plurality of interconnected grid points corresponding to positions in said electronic map for at least a portion of said indoor environment; or
a routability graph based, at least in part, on at least a portion of said connectivity map, said routability graph indicating one or more feasible paths within said indoor environment.

18. A mobile device comprising:
a communications interface; and
one or more processing units to:
initiate transmission of a request for an indoor navigation assistance data (INAD) update to a computing device via said communications interface, said request for said INAD update being based, at least in part, on at least one parameter indicative of a motion state of said mobile device within an indoor environment; and
obtain said INAD update from said computing device via said communications interface, said INAD update comprising a subset of INAD that is available for said indoor environment, said subset of INAD being determined based, at least in part, on a bounded region in an electronic map of said indoor environment, said bounded region having at least one of: a shape and/or a size affected based, at least in part, on said at least one parameter indicative of said motion state of said mobile device within said indoor environment and a profile indicative of a likelihood of subsequent movements of said mobile device determined, at least in part, on previous movements of one or more other mobile devices, said bounded region being identified by specifying at least one of the following: a grid point; a latitude; a longitude; a location context identifier (LCI); a map tile; a floor; a room; a distance; an angle; a geometric shape; or any combination thereof.

19. The mobile device as recited in claim 18, wherein said bounded region is selected based, at least in part, to encompass a likely position of said mobile device at a future time.

20. The mobile device as recited in claim 18, wherein said bounded region is selected based, at least in part, to encompass one or more points of interest in a vicinity of said mobile device.

21. The mobile device as recited in claim 18, said one or more processing units to further:
determine said bounded region; and
identify said bounded region in said request for said INAD update.

22. The mobile device as recited in claim 18, said one or more processing units to further:
determine a position of said mobile device based, at least in part, on said INAD update.

23. The mobile device as recited in claim 18, wherein said at least one parameter indicative of said motion state of said mobile device within said indoor environment is indicative of at least one of: a velocity of said mobile device; a heading of said mobile device; a potential route of said mobile device; a likely point of interest; or a motion mode.

24. The mobile device as recited in claim 18, wherein said subset of INAD comprises at least one of:
a radio heatmap for at least one transmitting device;
a probability heatmap for at least said at least one transmitting device;
a connectivity map indicative of a plurality of interconnected grid points corresponding to positions in said electronic map for at least a portion of said indoor environment; or
a routability graph based, at least in part, on at least a portion of said connectivity map, said routability graph indicating one or more feasible paths within said indoor environment.

25. An article comprising:
a non-transitory computer readable medium having stored therein computer implementable instructions executable by one or more processing units of a mobile device to:
initiate transmission of a request for an indoor navigation assistance data (INAD) update to a computing device via a communications interface, said request for said INAD update being based, at least in part, on at least one parameter indicative of a motion state of said mobile device within an indoor environment; and
obtain said INAD update from said computing device via said communications interface, said INAD update comprising a subset of INAD that is available for said indoor environment, said subset of INAD being determined based, at least in part, on a bounded region in an electronic map of said indoor environment, said bounded region having at least one of: a shape and/or a size affected based, at least in part, on said at least one parameter indicative of said motion state of said mobile device within said indoor environment and a profile indicative of a likelihood of subsequent movements of said mobile device determined, at least in part, on previous movements of one or more other mobile devices, said bounded region being identified by specifying at least one of the following: a grid point; a latitude; a longitude; a location context identifier (LCI); a map tile; a floor; a room; a distance; an angle; a geometric shape; or any combination thereof.

26. The article as recited in claim 25, wherein said bounded region is selected based, at least in part, to encompass a likely position of said mobile device at a future time.

27. The article as recited in claim 25, wherein said bounded region is selected based, at least in part, to encompass one or more points of interest in a vicinity of said mobile device.

28. The article as recited in claim 25, said one or more processing units to further:
  determine said bounded region; and
  identify said bounded region in said request for said INAD update.

29. The article as recited in claim 25, said one or more processing units to further:
  determine a position of said mobile device based, at least in part, on said INAD update.

30. The article as recited in claim 25, wherein said at least one parameter indicative of said motion state of said mobile device within said indoor environment is indicative of at least one of: a velocity of said mobile device; a heading of said mobile device; a potential route of said mobile device; a likely point of interest; or a motion mode.

31. The article as recited in claim 25, wherein said subset of INAD comprises at least one of:
  a radio heatmap for at least one transmitting device;
  a probability heatmap for at least said at least one transmitting device;
  a connectivity map indicative of a plurality of interconnected grid points corresponding to positions in said electronic map for at least a portion of said indoor environment; or
  a routability graph based, at least in part, on at least a portion of said connectivity map, said routability graph indicating one or more feasible paths within said indoor environment.

32. A method comprising, with a computing device:
  obtaining indoor navigation assistance data (INAD) for an indoor environment;
  receiving a request for an INAD update from a mobile device, said request for said INAD update being based, at least in part, on at least one parameter indicative of a motion state of said mobile device within said indoor environment; and
  transmitting said INAD update to said mobile device, said INAD update comprising a subset of said INAD, said subset of said INAD being determined based, at least in part, on a bounded region in an electronic map of said indoor environment, said bounded region having at least one of: a shape and/or a size affected based, at least in part, on said at least one parameter indicative of said motion state of said mobile device within said indoor environment and a profile indicative of a likelihood of subsequent movements of said mobile device determined, at least in part, on previous movements of one or more other mobile devices, said bounded region being identified by specifying at least one of the following: a grid point; a latitude; a longitude; a location context identifier (LCI); a map tile; a floor; a room; a distance; an angle; a geometric shape; or any combination thereof.

33. The method as recited in claim 32, wherein said bounded region is selected based, at least in part, to encompass a likely position of said mobile device at a future time.

34. The method as recited in claim 32, wherein said bounded region is selected based, at least in part, to encompass one or more points of interest in a vicinity of said mobile device.

35. The method as recited in claim 32, and further comprising, with said computing device:
  determining said bounded region.

36. The method as recited in claim 32, wherein said request for said INAD update is indicative of said bounded region.

37. The method as recited in claim 32, and further comprising, with said computing device:
  determining a frequency or a latency or combination thereof for transmitting one or more subsequent INAD updates to said mobile device based, at least in part, on said at least one parameter indicative of said motion state of said mobile device within said indoor environment; and
  transmitting at least one of said one or more subsequent INAD updates to said mobile device based, at least in part, on said determined frequency or said determined latency or said combination thereof.

38. The method as recited in claim 32, wherein said at least one parameter indicative of said motion state of said mobile device within said indoor environment is indicative of at least one of: a velocity of said mobile device; a heading of said mobile device; a potential route of said mobile device; a likely point of interest; or a motion mode.

39. The method as recited in claim 32, wherein said subset of said INAD comprises at least one of:
  a radio heatmap for at least one transmitting device;
  a probability heatmap for at least said at least one transmitting device;
  a connectivity map indicative of a plurality of interconnected grid points corresponding to positions in said electronic map for at least a portion of said indoor environment; or
  a routability graph based, at least in part, on at least a portion of said connectivity map, said routability graph indicating one or more feasible paths within said indoor environment.

40. An apparatus for use in a computing device, the apparatus comprising:
  means for obtaining indoor navigation assistance data (INAD) for an indoor environment;
  means for receiving a request for an INAD update from a mobile device, said request for said INAD update being based, at least in part, on at least one parameter indicative of a motion state of said mobile device within said indoor environment; and
  means for transmitting said INAD update to said mobile device, said INAD update comprising a subset of said INAD, said subset of said INAD being determined based, at least in part, on a bounded region in an electronic map of said indoor environment, said bounded region having at least one of: a shape and/or a size affected based, at least in part, on said at least one parameter indicative of said motion state of said mobile device within said indoor environment and a profile indicative of a likelihood of subsequent movements of said mobile device determined, at least in part, on previous movements of one or more other mobile devices, said bounded region being identified by specifying at least one of the following: a grid point; a latitude; a longitude; a location context identifier (LCI); a map tile; a floor; a room; a distance; an angle; a geometric shape; or any combination thereof.

41. The apparatus as recited in claim 40, wherein said bounded region is selected based, at least in part, to encompass a likely position of said mobile device at a future time.

42. The apparatus as recited in claim 40, wherein said bounded region is selected based, at least in part, to encompass one or more points of interest in a vicinity of said mobile device.

43. The apparatus as recited in claim 40, and further comprising:
  means for determining said bounded region.

44. The apparatus as recited in claim 40, wherein said request for said INAD update is indicative of said bounded region.

45. The apparatus as recited in claim 40, and further comprising:
means for determining a frequency or a latency or combination thereof for transmitting one or more subsequent INAD updates to said mobile device based, at least in part, on said at least one parameter indicative of said motion state of said mobile device within said indoor environment; and
means for transmitting at least one of said one or more subsequent INAD updates to said mobile device based, at least in part, on said determined frequency or said determined latency or said combination thereof.

46. The apparatus as recited in claim 40, wherein said at least one parameter indicative of said motion state of said mobile device within said indoor environment is indicative of at least one of: a velocity of said mobile device; a heading of said mobile device; a potential route of said mobile device; a likely point of interest; or a motion mode.

47. The apparatus as recited in claim 40, wherein said subset of said INAD comprises at least one of:
a radio heatmap for at least one transmitting device;
a probability heatmap for at least said at least one transmitting device;
a connectivity map indicative of a plurality of interconnected grid points corresponding to positions in said electronic map for at least a portion of said indoor environment; or
a routability graph based, at least in part, on at least a portion of said connectivity map, said routability graph indicating one or more feasible paths within said indoor environment.

48. A computing device comprising:
a communication interface; and
one or more processing units to:
obtain indoor navigation assistance data (INAD) for an indoor environment;
obtain a request for an INAD update from a mobile device via said communication interface, said request for said INAD update being based, at least in part, on at least one parameter indicative of a motion state of said mobile device within said indoor environment; and
initiate transmission of said INAD update to said mobile device via said communication interface, said INAD update comprising a subset of said INAD, said subset of said INAD being determined based, at least in part, on a bounded region in an electronic map of said indoor environment, said bounded region having at least one of: a shape and/or a size affected based, at least in part, on said at least one parameter indicative of said motion state of said mobile device within said indoor environment and a profile indicative of a likelihood of subsequent movements of said mobile device determined, at least in part, on previous movements of one or more other mobile devices, said bounded region being identified by specifying at least one of the following: a grid point; a latitude; a longitude; a location context identifier (LCI); a map tile; a floor; a room; a distance; an angle; a geometric shape; or any combination thereof.

49. The computing device as recited in claim 48, wherein said bounded region is selected based, at least in part, to encompass a likely position of said mobile device at a future time.

50. The computing device as recited in claim 48, wherein said bounded region is selected based, at least in part, to encompass one or more points of interest in a vicinity of said mobile device.

51. The computing device as recited in claim 48, said one or more processing units to further:
determine said bounded region.

52. The computing device as recited in claim 48, wherein said request for said INAD update is indicative of said bounded region.

53. The computing device as recited in claim 48, said one or more processing units to further:
determine a frequency or a latency or combination thereof for transmitting one or more subsequent INAD updates to said mobile device based, at least in part, on said at least one parameter indicative of said motion state of said mobile device within said indoor environment; and
initiate transmission, via said communication interface, of at least one of said one or more subsequent INAD updates to said mobile device based, at least in part, on said determined frequency or said determined latency or said combination thereof.

54. The computing device as recited in claim 48, wherein said at least one parameter indicative of said motion state of said mobile device within said indoor environment is indicative of at least one of: a velocity of said mobile device; a heading of said mobile device; a potential route of said mobile device; a likely point of interest; or a motion mode.

55. The computing device as recited in claim 48, wherein said subset of said INAD comprises at least one of:
a radio heatmap for at least one transmitting device;
a probability heatmap for at least said at least one transmitting device;
a connectivity map indicative of a plurality of interconnected grid points corresponding to positions in said electronic map for at least a portion of said indoor environment; or
a routability graph based, at least in part, on at least a portion of said connectivity map, said routability graph indicating one or more feasible paths within said indoor environment.

56. An article comprising:
a non-transitory computer readable medium having stored therein computer implementable instructions executable by one or more processing units in a computing device to:
access indoor navigation assistance data (INAD) for an indoor environment;
obtain a request for an INAD update from a mobile device, said request for said INAD update being based, at least in part, on at least one parameter indicative of a motion state of said mobile device within said indoor environment; and
initiate transmission of said INAD update to said mobile device, said INAD update comprising a subset of said INAD, said subset of said INAD being determined based, at least in part, on a bounded region in an electronic map of said indoor environment, said bounded region having at least one of: a shape and/or a size affected based, at least in part, on said at least one parameter indicative of said motion state of said mobile device within said indoor environment and a profile indicative of a likelihood of subsequent movements of said mobile device determined, at least in part, on previous movements of one or more other mobile devices, said bounded region being identified by specifying at least one of the following: a grid point; a latitude; a longitude; a location context identifier (LCI); a map tile; a floor; a room; a distance; an angle; a geometric shape; or any combination thereof.

57. The article as recited in claim 56, wherein said bounded region is selected based, at least in part, to encompass a likely position of said mobile device at a future time.

58. The article as recited in claim 56, wherein said bounded region is selected based, at least in part, to encompass one or more points of interest in a vicinity of said mobile device.

59. The article as recited in claim 56, said computer implementable instructions being further executable by said one or more processing units to:
   determine said bounded region.

60. The article as recited in claim 56, wherein said request for said INAD update is indicative of said bounded region.

61. The article as recited in claim 56, said computer implementable instructions being further executable by said one or more processing units to:
   determine a frequency or a latency or combination thereof for transmitting one or more subsequent INAD updates to said mobile device based, at least in part, on said at least one parameter indicative of said motion state of said mobile device within said indoor environment; and
   initiate transmission of at least one of said one or more subsequent INAD updates to said mobile device based, at least in part, on said determined frequency or said determined latency or said combination thereof.

62. The article as recited in claim 56, wherein said at least one parameter indicative of said motion state of said mobile device within said indoor environment is indicative of at least one of: a velocity of said mobile device; a heading of said mobile device; a potential route of said mobile device; a likely point of interest; or a motion mode.

63. The article as recited in claim 56, wherein said subset of said INAD comprises at least one of:
   a radio heatmap for at least one transmitting device;
   a probability heatmap for at least said at least one transmitting device;
   a connectivity map indicative of a plurality of interconnected grid points corresponding to positions in electronic map for at least a portion of said indoor environment; or
   a routability graph based, at least in part, on at least a portion of said connectivity map, said routability graph indicating one or more feasible paths within said indoor environment.

* * * * *